(12) United States Patent
Honjo et al.

(10) Patent No.: US 11,941,969 B2
(45) Date of Patent: *Mar. 26, 2024

(54) SYSTEMS AND METHODS FOR PROCESSING COEXISTING SIGNALS FOR RAPID RESPONSE TO USER INPUT

(71) Applicant: GOOGLE LLC, Mountain View, CA (US)

(72) Inventors: Hirofumi Honjo, Mountain View, CA (US); Prashanth Ramachandran, Foster City, CA (US); Mikko Sannala, Mountain View, CA (US); Naveen Singh, San Jose, CA (US); Wes Calidonna, Campbell, CA (US); Arjuna Sivasithambaresan, Mountain View, CA (US); Harry Tannenbaum, San Francisco, CA (US); Scott Hong, Palo Alto, CA (US)

(73) Assignee: Google LLC, Mountain View, CA (US)

(*) Notice: Subject to any disclaimer, the term of this patent is extended or adjusted under 35 U.S.C. 154(b) by 84 days.

This patent is subject to a terminal disclaimer.

(21) Appl. No.: 16/241,772

(22) Filed: Jan. 7, 2019

(65) Prior Publication Data

US 2019/0164410 A1     May 30, 2019

Related U.S. Application Data

(63) Continuation of application No. 14/616,302, filed on Feb. 6, 2015, now Pat. No. 10,204,505.

(51) Int. Cl.
*G08B 25/00* (2006.01)
*G08B 19/00* (2006.01)
(Continued)

(52) U.S. Cl.
CPC ......... *G08B 25/004* (2013.01); *G08B 19/005* (2013.01); *G08B 25/001* (2013.01);
(Continued)

(58) Field of Classification Search
None
See application file for complete search history.

(56) References Cited

U.S. PATENT DOCUMENTS 7,826,411 B2    11/2010   Gonikberg et al.
8,340,580 B1    12/2012   Epstein
(Continued)

FOREIGN PATENT DOCUMENTS

| EP | 2750075 A1 | 7/2014 |
|---|---|---|
| WO | 2014/047501 A1 | 3/2014 |
| WO | 2014/190370 A1 | 12/2014 |

*Primary Examiner* — Chirag G Shah
*Assistant Examiner* — Suk Jin Kang
(74) *Attorney, Agent, or Firm* — Kilpatrick Townsend & Stockton LLP

(57) ABSTRACT

Systems and methods for enabling a system to rapidly respond to wireless instructions being transmitted by a personal device over one of several communications networks that share a common RF medium are provided. During operation of the system, certain network communications may take priority over other network communications. Rapid response communications enable a user to communicate with the system, using the personal device, in a manner that does not collide or interfere with higher priority network communications.

16 Claims, 26 Drawing Sheets

(51) Int. Cl.
  *H04W 4/70* (2018.01)
  *H04W 12/06* (2021.01)
  *H04W 12/08* (2021.01)
  *H04W 52/02* (2009.01)
  *H04W 74/08* (2009.01)

(52) U.S. Cl.
  CPC .......... *G08B 25/002* (2013.01); *H04W 12/06* (2013.01); *H04W 12/08* (2013.01); *H04W 52/0274* (2013.01); *H04W 52/0296* (2013.01); *H04W 74/085* (2013.01); *G08B 25/008* (2013.01); *G08B 25/009* (2013.01); *H04W 4/70* (2018.02); *Y02D 30/70* (2020.08)

(56) References Cited

U.S. PATENT DOCUMENTS

| | | |
|---|---|---|
| 8,588,091 B2 | 11/2013 | Trainin |
| 8,779,919 B1 | 7/2014 | Darling et al. |
| 8,988,232 B1 | 3/2015 | Sloo et al. |
| 9,107,172 B1 | 8/2015 | Epstein |
| 9,674,885 B2 | 6/2017 | Erickson et al. |
| 10,204,505 B2 | 2/2019 | Honjo et al. |
| 2005/0147057 A1 | 7/2005 | LaDue |
| 2005/0153725 A1 | 7/2005 | Naghian et al. |
| 2005/0160162 A1 | 7/2005 | Cromer et al. |
| 2006/0226973 A1 | 10/2006 | Catlin |
| 2006/0287008 A1 | 12/2006 | Twitchell, Jr. |
| 2006/0292987 A1* | 12/2006 | Ophir ............... H04W 72/1215 455/41.2 |
| 2007/0241877 A1* | 10/2007 | Jobe ..................... G08B 25/009 340/506 |
| 2007/0281617 A1 | 12/2007 | Meylan et al. |
| 2008/0021658 A1 | 1/2008 | Pavel et al. |
| 2008/0279138 A1 | 11/2008 | Gonikberg et al. |
| 2009/0029716 A1 | 1/2009 | Thomas |
| 2009/0122737 A1 | 5/2009 | Twitchell, Jr. |
| 2009/0196306 A1* | 8/2009 | King ................... H04L 12/4015 370/462 |
| 2009/0225717 A1 | 9/2009 | Banerjea |
| 2010/0020166 A1 | 1/2010 | Levine et al. |
| 2011/0012729 A1 | 1/2011 | Hess |
| 2011/0021142 A1 | 1/2011 | Desai et al. |
| 2011/0181510 A1* | 7/2011 | Hakala .................... G06F 3/017 345/158 |
| 2011/0238234 A1 | 9/2011 | Chen |
| 2012/0082036 A1 | 4/2012 | Abedi et al. |
| 2012/0087350 A1* | 4/2012 | Norair ................. H04B 7/2656 370/336 |
| 2012/0119902 A1* | 5/2012 | Patro ................. H04W 52/0238 340/502 |
| 2012/0282974 A1 | 11/2012 | Green et al. |
| 2013/0201316 A1 | 8/2013 | Binder et al. |
| 2014/0007264 A1 | 1/2014 | Berger |
| 2014/0031001 A1 | 1/2014 | Jacobsen |
| 2014/0052832 A1 | 2/2014 | Dina et al. |
| 2014/0085092 A1 | 3/2014 | Fadell et al. |
| 2014/0094137 A1 | 4/2014 | Gregory |
| 2014/0219216 A1 | 8/2014 | Lee et al. |
| 2014/0266669 A1 | 9/2014 | Fadell et al. |
| 2014/0313044 A1 | 10/2014 | Thompson et al. |
| 2014/0351098 A1* | 11/2014 | Shafer .................. G06Q 10/087 705/28 |
| 2014/0368331 A1* | 12/2014 | Cohn ................... H04L 12/2818 709/219 |
| 2014/0376405 A1* | 12/2014 | Erickson ............... H04L 9/3263 370/254 |
| 2015/0016407 A1* | 1/2015 | Erickson ................. H04L 67/34 370/329 |
| 2015/0022316 A1* | 1/2015 | Dixon .................... G08B 29/02 340/5.51 |
| 2015/0022339 A1* | 1/2015 | Matsuoka ............ G08B 21/182 340/506 |
| 2015/0022341 A1* | 1/2015 | Matsuoka ............ G08B 25/008 340/514 |
| 2015/0022344 A1* | 1/2015 | Matsuoka ............ G08B 29/185 340/523 |
| 2015/0022345 A1* | 1/2015 | Matsuoka ............ G08B 25/002 340/527 |
| 2015/0022367 A1* | 1/2015 | Matsuoka .............. G08B 17/10 340/692 |
| 2015/0023293 A1* | 1/2015 | Erickson ............... H04L 9/3247 370/329 |
| 2015/0023294 A1* | 1/2015 | Erickson .................. H04L 9/32 370/329 |
| 2015/0023339 A1* | 1/2015 | Erickson ................ H04L 45/74 370/338 |
| 2015/0049712 A1 | 2/2015 | Chen et al. |
| 2015/0095680 A1 | 4/2015 | Gossain et al. |
| 2015/0109976 A1 | 4/2015 | Zhang et al. |
| 2015/0145653 A1 | 5/2015 | Katingari et al. |
| 2015/0172878 A1 | 6/2015 | Luna |
| 2015/0187194 A1* | 7/2015 | Hypolite ................... G08B 7/06 340/628 |
| 2015/0271268 A1 | 9/2015 | Finkelstein |
| 2015/0301615 A1* | 10/2015 | Kasar ...................... G06F 3/017 345/156 |
| 2015/0350821 A1 | 12/2015 | Dina et al. |
| 2016/0005306 A1* | 1/2016 | McWhirter .......... G08B 13/196 340/539.1 |
| 2016/0014772 A1* | 1/2016 | Suresh ...................... H04J 3/02 370/337 |
| 2016/0035214 A1* | 2/2016 | Witmer ............. G08B 13/2491 340/565 |
| 2016/0071402 A1* | 3/2016 | Chiarizio ................ H04B 1/713 340/539.17 |
| 2016/0073342 A1 | 3/2016 | Szewczyk et al. |
| 2016/0073343 A1 | 3/2016 | Szewczyk et al. |
| 2016/0077791 A1 | 3/2016 | Gossain et al. |
| 2016/0088424 A1 | 3/2016 | Polo et al. |
| 2016/0105809 A1* | 4/2016 | Chou ................... H04L 41/0686 370/216 |
| 2016/0231817 A1 | 8/2016 | Tannenbaum et al. |
| 2016/0234765 A1 | 8/2016 | Tannenbaum et al. |
| 2017/0124854 A1* | 5/2017 | Otis ......................... G08B 3/10 |
| 2017/0325201 A1 | 11/2017 | Chen et al. |
| 2018/0054774 A1* | 2/2018 | Cohn .................. G06F 11/0757 |
| 2020/0020216 A1* | 1/2020 | Slavin ................ G08B 13/2491 |
| 2022/0058938 A1* | 2/2022 | Hutz ...................... G08B 25/00 |

* cited by examiner

SYSTEMS AND METHODS FOR PROCESSING COEXISTING SIGNALS FOR RAPID RESPONSE TO USER INPUT

This application is a continuation of U.S. patent application Ser. No. 14/616,302, filed Feb. 6, 2015, which is incorporated by reference in its entirety for all purposes.

TECHNICAL FIELD

This patent specification relates to systems and methods for enabling rapid response to instructions being wirelessly transmitted in a potentially high collision environment. In particular, this specification relates to enabling communications using two different communications networks that share the same RF medium.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes, office buildings, and other structures. Some of these devices are capable of communicating with each other using a network. Some of these devices may be hazard detection systems, such as smoke detectors, carbon monoxide detectors, combination smoke and carbon monoxide detectors, or may be other systems for detecting other conditions have been used in residential, commercial, and industrial settings for safety and security considerations. When these systems detect the presence of a dangerous condition, they often sound an audible alarm. The alarm is often characterized as having an extremely loud or ear piercing sound, and can be unpleasant or very uncomfortable to a human listener. Some hazard detectors may permit a user to press a button located on the cover of the unit, sometimes termed a hush button or temporary silence button, when they know an alarm to be caused by a non-emergency situation, such as smoke from cooking. When the hush button or temporary silence button is pressed, the audible alarm noise is temporarily silenced for a predetermined interval of time, such as in the range of four to ten minutes, during which the user has an opportunity to address the situation, such as by opening a window, without being required to endure the ear-piercing sound of the alarm. If the condition persists at the end of the predetermined interval of time, then the audible alarm noise resumes. One issue that can arise in many practical situations is that the hazard detector unit is mounted high on a wall or on a ceiling that is out of the reach of the user, leading many users to seek out a ladder, chair, or broomstick in order to press the hush button or temporary silence button, which can lead to inconvenient, impractical, and/or unsafe scenarios. Other issues arise as would be apparent to a person skilled in the art in view of the instant disclosure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for enabling a system to rapidly respond to wireless instructions being transmitted by a personal device over one of several communications networks that share a common RF medium are provided. The system may include several communications circuits that may compete for access to the same RF medium such as, for example, a common antenna and/or operating frequency. The personal device may include similar communications circuits for communicating with the system over the same RF medium. During operation of the system, certain network communications may take priority over other network communications. For example, the system may prioritize first network communications for a fixed period of time before another network can be used. Rapid response communications enable a user to communicate with the system, using the personal device, prior to the end of the fixed period of time. Thus, the system and the personal device can communicate with each other using a second communications network in a manner that does not collide or interfere with the first network communications. Embodiments discussed herein manage the coexistence of signals on multiple communication networks that require access to the same RE medium in order to enable rapid interaction between a personal device and a system while the system is engaged in priority communications.

In one embodiment, a method for processing coexistence signals in a system including several wireless communication circuits is provided. The method can include broadcasting a plurality of wake packets using a first wireless communication circuit, wherein each wake packet transmission period comprises an active portion and an idle portion, and wherein the wake packet is transmitted during the activity portion. The method can include selectively enabling a second wireless communication circuit to communicate with a remote device during the idle portion of at least one wake packet transmission period, and determining whether to alter a state of the system in response to data communicated from the remote device.

In another embodiment, a hazard detection system is provided. The system can include first communications circuitry operative to broadcast wake packets to wake up other systems that form part of a fabric network, wherein each wake packet transmission period comprises an active portion during which the wake packet is transmitted and an idle portion. The system can include second communication circuitry coupled to the first communication circuitry, the second communications circuitry operative to communicate with a remote device during the idle portion of each wake packet transmission period, and a processor operative to change a state of the system in response to an instruction received from the remote device during the idle portion of one of the broadcasted wake packets.

In yet another embodiment, a method for facilitating rapid response to remotely generated commands is provide. The method can be implemented in a hazard detection system that forms part of a fabric network of systems that communicate with each other via the fabric network. The method can include executing at least one state machine that controls a state of operation of the system, managing coexisting first and second signals during a wake packet broadcasting session such that a second signal can be received and acted upon to change the state of operation of the system prior to an end of the wake packet broadcasting session, wherein the first signal is broadcasted to alert the other systems of the fabric network of a first state of the system, and wherein the second signal comprises an instruction generated by a remote device that is not part of the fabric network and is operative to change the system to a second state.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

DETAILED DESCRIPTION OF THE DISCLOSURE

Figure 1:
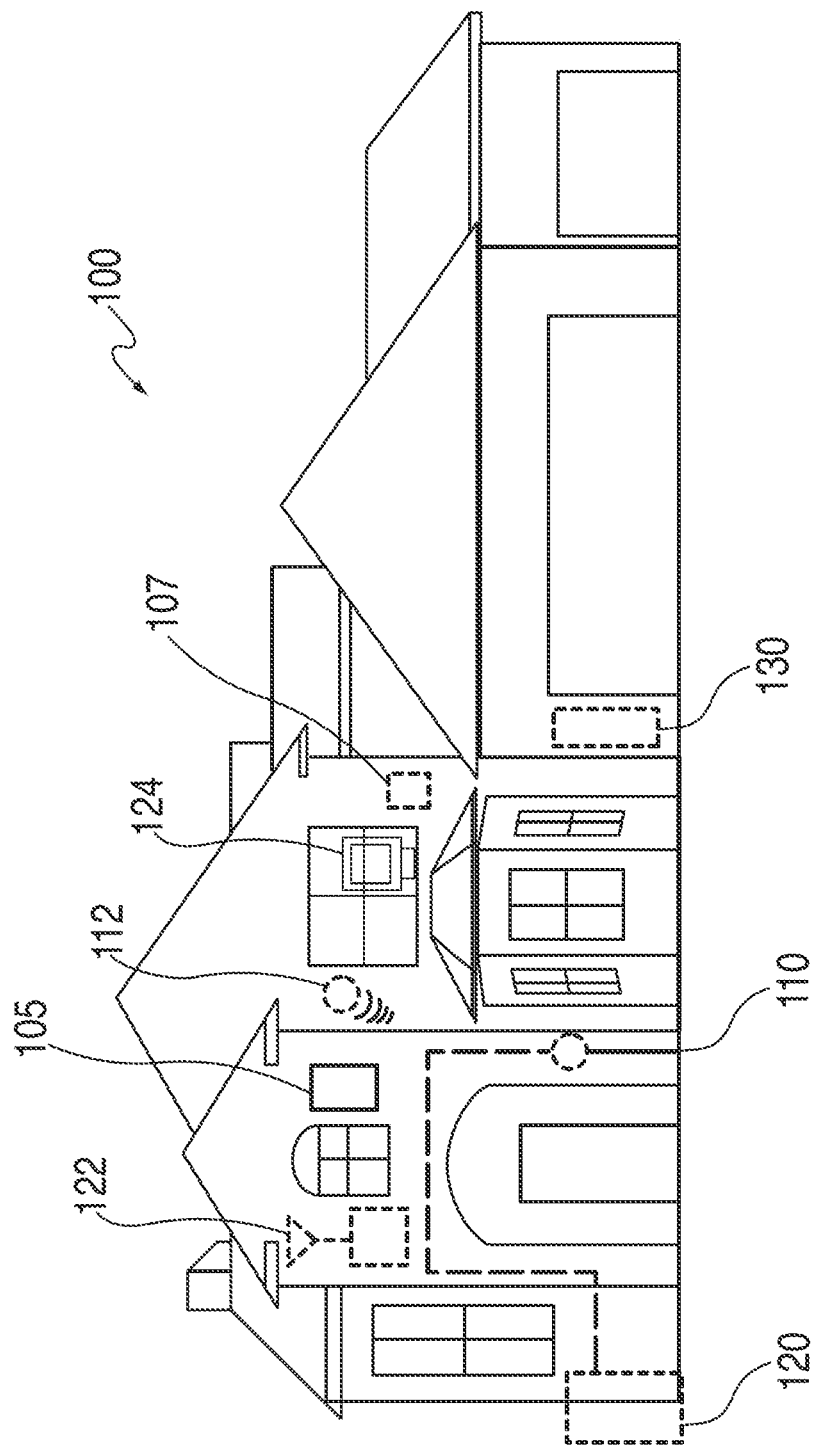
FIG. 1 is a diagram of an enclosure with a hazard detection system, according to some embodiments.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

This disclosure relates to enabling rapid response to close proximity network instructions generated by an out of fabric network device such as a personal device while a fabric network device such as a hazard detection system is engaged in a fabric network wakeup event and is not yet able to conduct cloud network communications. As defined herein, a fabric network device can be a device or system capable of communicating with other devices using one of several different wireless communication circuits. Each communications circuit may be operative to communicate according to a different protocol that supports different network communications. For example, a first wireless communications circuit may conduct fabric network communications, a second wireless communications circuit can conduct close-proximity network communications, and a third wireless communications circuit can participate in cloud network communications. Fabric network communications may serve as the principal inter-device communications between fabric devices, and may be served, for example, by 6LoWPAN communications circuitry. Close-proximity communications may be used for inter fabric and non-fabric device communications, and may be served, for example, by Bluetooth communications circuitry. Cloud network communications may be served by Wi-Fi communications circuitry. Wi-Fi circuitry may access a router to enable communications between a fabric device and a personal device.

As defined herein, an out of fabric network device may be a personal device such as a cellphone, a tablet, computer, wearable, or other device that can communicate with the fabric network device using network communications other than through the fabric network. For example, the personal device may communicate with a fabric device using close-proximity network communications or cloud network communications. The close-proximity network communications may be used to enable the personal and fabric devices to engage in rapid response data transactions in situations where cloud network communications are not available. Cloud network communications may not be available, for example, when the fabric device is in a sleep state, awakening from a sleep state, or otherwise operating in a state where cloud network communications are not available.

In some embodiments each of the wireless communication circuits may compete for access to the same RF medium such as, for example, a common antenna and/or operating frequency. Thus, during various operational conditions, such as during a fabric network wakeup event, certain network communications may take priority over other network communications even though multiple communications networks are available. For example, during the fabric network wakeup event, the fabric network device may be able to communicate using fabric network communications. Close proximity network communications may be available to communicate with the personal device, but not cloud network communications. As such, the fabric device may not be able to communicate with the personal device via the cloud communications network until this network is available. Thus, in the interim, any communications with the personal device may be made using the close-proximity network so long as use of the close-proximity network does not collide or interfere with use of the fabric network communications. Embodiments discussed herein manage the coexistence of signals on multiple communication networks that require access to the same RF medium in order to enable rapid interaction with a personal device while the fabric network alerts other fabric devices during a wake event.

This disclosure also relates to processing gestures to alter the state of a system. The gestures may be made with respect to a personal device that is located remote from the system that is altering its state. The device may monitor for and process gestures enacted by a user and transmit an appropriate instruction to the system in response to the processed gesture. The system may be capable of monitoring for and processing the same gestures, but enabling the user to use his or her device may provide an added benefit of convenience. Moreover, the personal device may benefit from having additional sensors and/or computing power than its system counterpart for processing such gestures, thereby potentially providing enhanced gesture detection. The gestures can be user-enacted actions performed using the device or within the monitorable vicinity of the system. For example, if the system is sounding an alarm, the user may perform a hush gesture using the device to instruct the system to cease sounding the alarm.

Users may interact with the device by physically manipulating it as part of a gesture. Such interactions may be akin to using the device as a wand or wearable that moves in conjunction with the user's hand, arm, or other body part. Alternatively, users may perform gestures in a monitorable vicinity of device. Such gestures may be gestures performed by the user in the presence of the device, but not necessarily moving the device itself in accordance with a gesture. For example, the device may be lying on a table and monitoring for user gestures performed in a monitorable vicinity of the device. As an example of a specific gesture, a user may wave his hand in front of the device to invoke transmission of an instruction to the system.

Certain systems may impose location verification conditions on the remote device that is transmitting instructions before committing to a change in operational state. For example, a hazard detection system (e.g., smoke sensor and/or CO sensor) may require verification that the device is located within the same structure as the device. The specificity of device location may vary for different system. For example, some systems may that the device be in "line of sight" or the same room as the system, whereas other systems may require that the device be in the same structure of the system. Additional details on these embodiments are discussed below.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, radon, methane and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure), visual safety indicators (e.g., display of a green light indicates it is safe and display of a red light indicates danger), tactile and non-tactile input command processing, and software updates.

Hazard detection system 105 can monitor other conditions that not necessarily tied to hazards, per se, but can be configured to perform a security role. In the security role, system 105 may monitor occupancy (using a motion detector), ambient light, sound, remote conditions provided by remote sensors (door sensors, window sensors, and/or motion sensors). In some embodiments, system 105 can perform both hazard safety and security roles, and in other embodiments, system 105 may perform one of a hazard safety role and a security role.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link (e.g., the fabric network).

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link (e.g., the fabric network), or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Although one or more states of the sensor state machines and system state machines may be implemented in one or more of the power consumption modes, the power consumption modes and states may be different. For example, the power consumption mode nomenclature is used in connection with various power budgeting systems and methods that are explained in more detail in U.S. Provisional Application Nos. 61/847,905 and 61/847,916.

Figure 2:
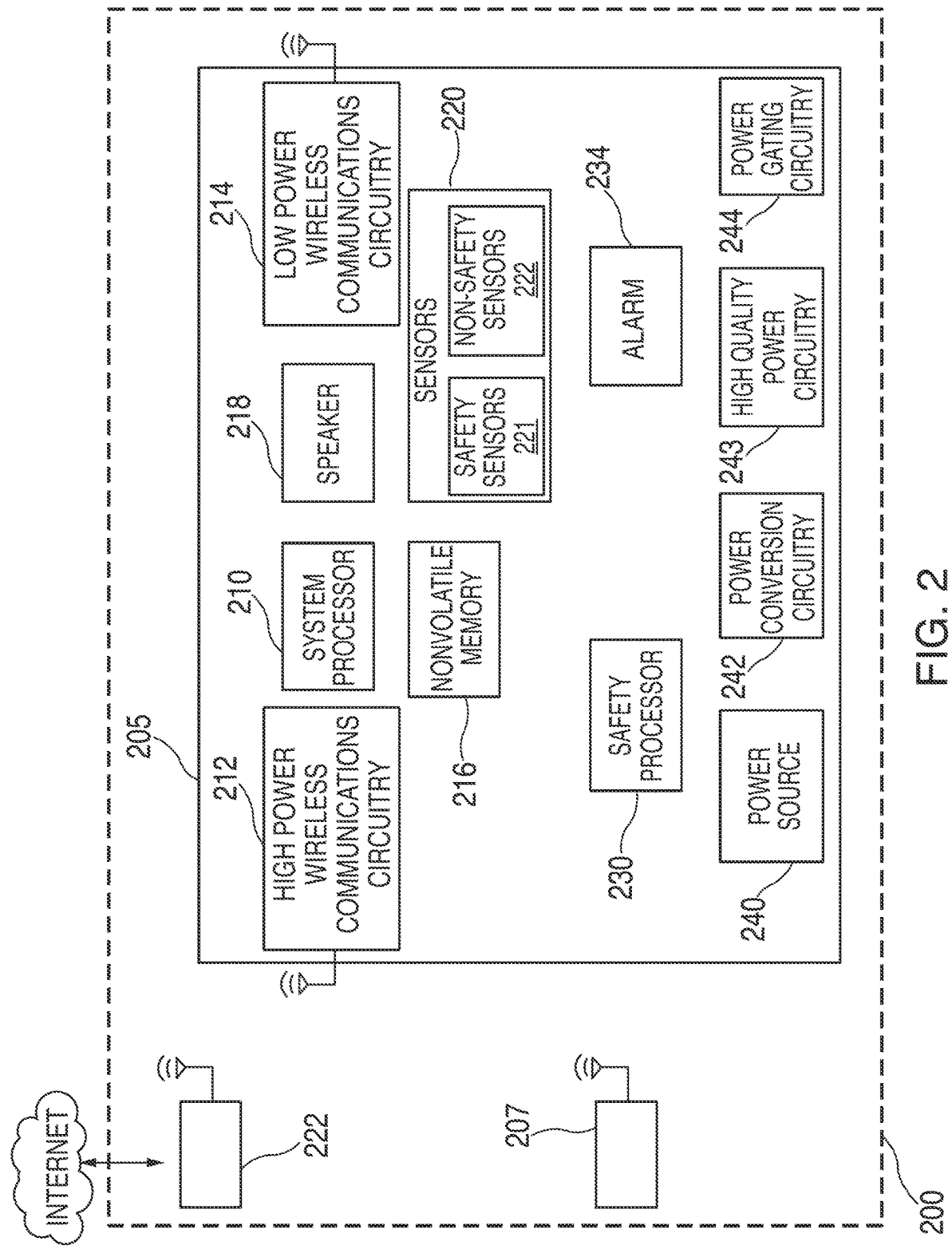
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, and power gating circuitry 244. Hazard detection system 205 may be operative to provide failsafe safety detection features and user interface features using circuit topology and power budgeting methods that may minimize power consumption.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. System processor 210 can be operative to process user interface features. For example, processor 210 can direct wireless data traffic on both high and low power wireless communications circuitries 212 and 214, access non-volatile memory 216, communicate with processor 230, and cause audio to be emitted from speaker 218. As another example, processor 210 can monitor data acquired by one or more sensors 220 to determine whether any actions need to be taken (e.g., shut off a blaring alarm in response to a user detected action to hush the alarm).

Safety processor 230 can be operative to handle safety related tasks of system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory. In other embodiments, processor 230 may be updated when system 205 is in the field.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core alarming features of system 205 will operate regardless of whether processor 210 is functioning. By way of example and not by way of limitation, system processor 210 can include a relatively high-powered processor such as Freescale Semiconductor K60 Microcontroller, while safety processor 230 may comprise a relatively low-powered processor such as a Freescale Semiconductor KL16 Microcontroller. Overall operation of hazard detection system 205 entails a judiciously architected cooperation of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions that it performs are judiciously selected and timed such that the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using WiFi part number BCM43362, available from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as a Wi-Fi update mode, software update mode, or alarm mode, circuitry 212 can be in an "active" state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to a 802.15.4 protocol. In some embodiments, low power wireless communications circuitry 214 may serve as a node in a fabric network of devices. In another embodiment, circuitry 214 can be part number EM357 SoC available from Silicon Laboratories. Depending on the operating mode of system 205, circuitry 214 can operate in a relatively low power "sleep" state or a relatively high power "awake" state. When system 205 is in the Idle mode, WiFi update mode, or software update mode, circuitry 214 can be in the "sleep" state. Circuitry 214 may transition from the sleep state to the awake state in response to receipt of a wake packet (transmitted by another device) or in response to a state change in one of the state machines running on system 205. When system 205 is in the Alarm mode, circuitry 214 can transmit fabric messages so that the low power wireless communications circuitry in system 207 can receive data indicating that system 205 is alarming Thus, even though it is possible for high power wireless communications circuitry 212 to be used for listening for alarm events, it can be more power efficient to use low power circuitry 214 for this purpose. Power savings may be further realized when several hazard detection systems or other systems having low power circuitry 214 form an interconnected wireless fabric network.

Power savings may also be realized because in order for low power circuitry 214 to continually listen for data transmitted from other low power circuitry, circuitry 214 may constantly be operating in its "sleep" state. This state consumes power, and although it may consume more power than high power circuitry 212 operating in its sleep state, the power saved versus having to periodically activate high power circuitry 214 can be substantial. When high power circuitry 212 is in its active state and low power circuitry 214 is in its awake state, high power circuitry 212 can consume substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates.

In some embodiments, low power wireless communications circuitry 214 may be a mesh network compatible module that does not require a distinguished access point in order to communicate to devices in a network. Mesh network compatibility can include provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point in order to communicate to devices in a network. Thus, if a first device having circuitry 212 wants to communicate data to another device having circuitry 212, the first device has to communicate with the access point, which then transmits the data to the second device. There is no device-to-device communication per se using circuitry 212.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warnings in one or more languages. Speaker 218 can be any suitable speaker operable to playback sounds or audio files. Speaker 218 can include an amplifier (not shown).

Sensors 220 can be monitored by system processor 210 and safety processor 230, and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but may provide the acquired sensor data to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors might only include a smoke sensor, at least one temperature sensor and a relative humidity sensor. Other sensors, such as non-safety sensors, could be included as part of system 205, but might not be needed to detect smoke or fire. As another example, if the hazardous condition includes carbon monoxide, then the safety sensor might be a carbon monoxide sensor, and no other sensor might be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following necessary safety sensors 221: a smoke detector, a carbon monoxide (CO) sensor, and one or more temperature sensors. Smoke detectors typically use optical detection, ionization, or air sampling techniques to trigger the smoke condition. Optical scattering and obscuration detection techniques may use infrared light emitting diodes (LEDs) and photodiodes. When smoke and/or other matter (e.g., water vapor) enters a smoke chamber, the light emitted by the LED(s) is scattered, which enables the photodiodes to detect the light. If no smoke or other matter (e.g., water vapor) is in the smoke chamber, then the photodiodes are not be able to detect the light being emitted by the LED(s). Ionization techniques may use a radioactive material such as Americium-241 to ionize the air, which creates a measurable current between detector two plates. When smoke particles enter the chamber, they bind to the ions. The reaction produces a measurable drop in the conducted current between detector plates; the resulting drop indicates smoke detection. In some geographic locations (e.g., Europe) traditional Americium-241 ionization smoke detectors are banned by regulatory agencies in part because of the necessity to dispose of a radioactive material at the end of the smoke detector's life. A smoke detector can also use a non-radioactive ionization technique to detect the presence of smoke and/or other particulate matter. A non-radioactive ionizing detector may use a LED such as an ultraviolet emitting LED with a photocatalyst coating. The photocatalyst generates ions when light (e.g., UV light) passes through it. When these ions are displaced or neutralized by smoke and/or other matter, the detector detects a change in current between two plates and register a smoke event.

A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after a 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. A relative humidity sensor may be used to distinguish between obscuration caused by smoke and steam or fog.

Furthermore, in this embodiment, detection system 205 can include the following non-safety sensors 222: a humidity sensor, an ambient light sensor, a push-button sensor, a passive infra-red (PIR) sensor, and one or more ultrasonic sensors. A temperature and humidity sensor can provide relatively accurate readings of temperature and relative humidity for the purposes of environmental monitoring and HVAC control. An ambient light sensor (ALS) can detect ambient light and the push-button sensor can be a switch, for example, that detects a user's press of the switch. A PIR sensor can be used for various motion detection features. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 may be mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 may not need any of the data acquired from non-safety sensor 222 to perform its hazard monitoring and alerting functions, the non-safety sensor data can be utilized to provide enhanced hazard system 205 functionality. The enhanced functionality can be realized in alarming algorithms according to various embodiments discussed herein. For example, the non-sensor data can be utilized by system processor 210 to implement system state machines that may interface with one or more sensor state machines, all of which are discussed in more detail below in connection with the description accompanying FIG. 3 and in U.S. Provisional Application No. 61/847,937.

Alann 234 can be any suitable alarm that alerts users in the vicinity of system 205 of the presence of a hazard condition. Alarm 234 can also be activated during testing scenarios. Alarm 234 can be a piezo-electric buzzer, for example.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years, or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 includes one or more batteries or a battery pack. The batteries can be constructed from different compositions (e.g., alkaline or lithium iron disulfide) and different end-user configurations (e.g., permanent, user replaceable, or non-user replaceable)

can be used. In one embodiment, six cells of Li—FeS2 can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different than the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors 221 such as smoke detectors and CO sensors require a more stable voltage in order to operate properly than a digital circuitry within the system processor 210.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, power gating circuitry 244 itself may consume a small amount of power. This power consumption, however, is less than the quiescent power loss of the component.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

Figure 3:
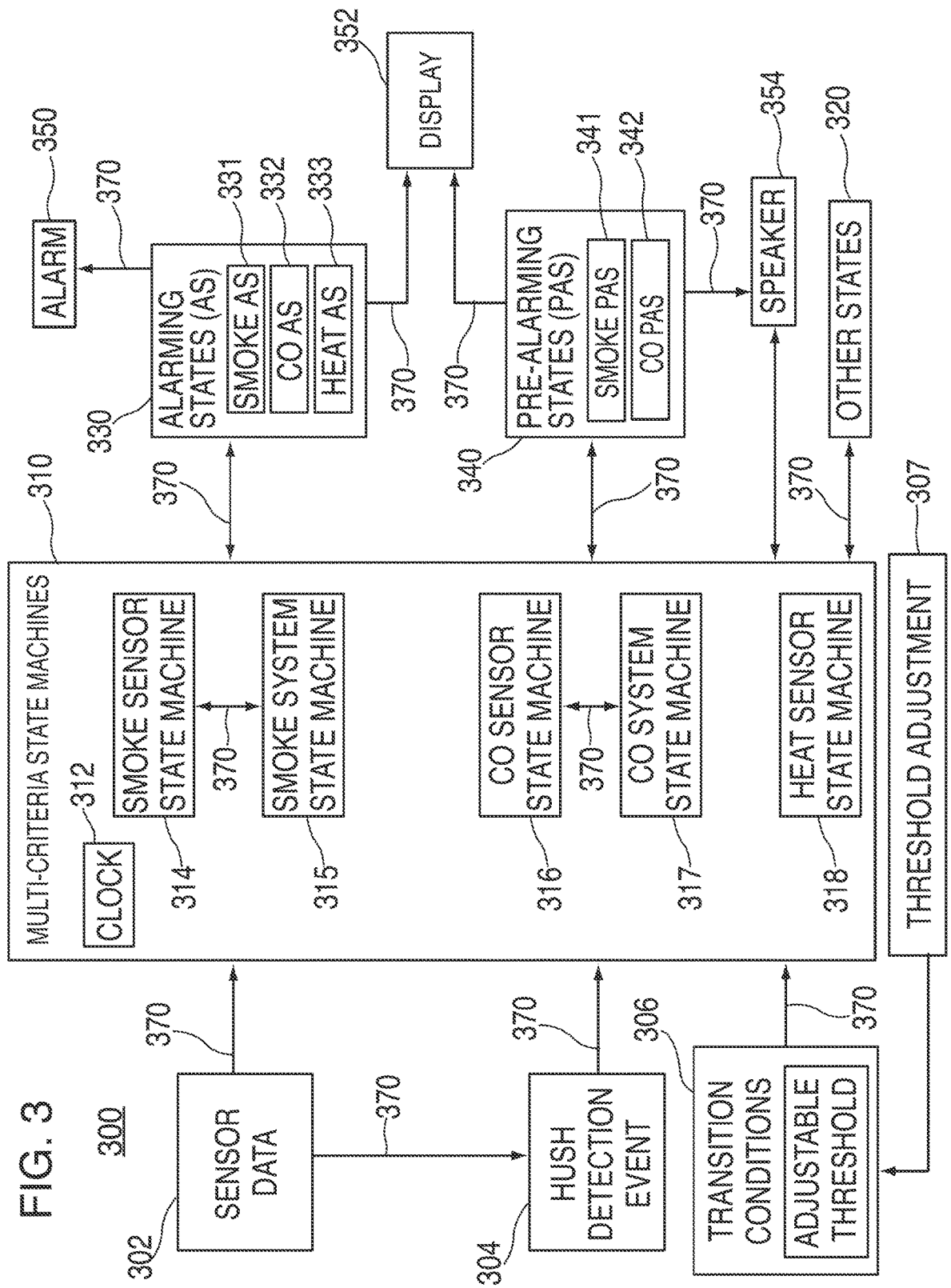
FIG. 3 shows an illustrative block diagram showing various components of a hazard detection system working together to provide multi-criteria alarming and pre-alarming functionality, according to some embodiments.

FIG. 3 shows an illustrative block diagram showing various components of hazard detection system 300 working together to provide multi-criteria alarming and pre-alarming functionalities according to various embodiments. As shown, system 300 can include sensor data 302, hush detection events 304, transition conditions 306, threshold adjustment parameter 307, multi-criteria state machines 310, clock 312, other states 320, alarming states 330, pre-alarming states 340, alarm 350, display 352, and speaker 354. Also shown are several communication links 370, each of which may have unidirectional or bidirectional data and/or signal communications capabilities. Multi-criteria state machines 310 can control alarming states 330, pre-alarming states 340, and all other state machine states 320 based on sensor data 302, hush detection events 304, transition conditions 306, clock 312, and other criteria, and alarming and pre-alarming states 330 and 340 can control the output of alarm 350, display 352, and speaker 354. Alarming states 330 can include multiple alarming states (e.g., one for each hazard, such as smoke alarming state 331, CO alarming state 332, and heat alarming state 333) and pre-alarming states 340 can include multiple pre-alarming states (e.g., one or more for each hazard, such as smoke pre-alarming state 341 and CO pre-alarming state 342. Other states can include, for example, idling states, monitoring states, alarm hushing states, pre-alarm hushing states, post-alarm states, holding states, and alarm monitoring states.

Alarming states 330 can control activation and deactivation of alarm 350 and display 352 in response to determinations made by multi-criteria state machines 310. Alarm 350 can provide audible cues (e.g., in the form of buzzer beeps) that a dangerous condition is present. Display 352 can provide a visual cue (e.g., such as flashing light or change in color) that a dangerous condition is present. If desired, alarming states 330 can control playback of messages over speaker 354 in conjunction with the audible and/or visual cues. For example, combined usage of alarm 350 and speaker 354 can repeat the following sequence: "BEEP, BEEP, BEEP—Smoke Detected In Bedroom— BEEP BEEP BEEP," where the "BEEPS" emanate from alarm 350 and "smoke detected in bedroom" emanates from speaker 354. As another example, usage of alarm 350 and speaker 354 can repeat the following sequence: "BEEP, BEEP, BEEP—Wave to Hush Alarm—BEEP BEEP BEEP," in which speaker 354 is used to provide alarming hush instructions. Any one of the alarming states 330 (e.g., smoke alarm state 331, CO alarm state 332, and heat alarm state 333) can independently control alarm 350 and/or display 352 and/or speaker 354. In some embodiments, alarming states 330 can cause alarm 350 or display 352 or speaker 354 to emit different cues based on which specific alarm state is active. For example, if a smoke alarm state is active, alarm 350 may emit a sound having a first characteristic, but if a CO alarm state is active, alarm 350 may emit a sound having a second characteristic. In other embodiments, alarming states 330 can cause alarm 350 and display 352 and speaker 354 to emit the same cue regardless of which specific alarm state is active.

Pre-alarming states 340 can control activation and deactivation of speaker 354 and display 352 in response to determinations made by multi-criteria state machines 310. Pre-alarming can serve as a warning that a dangerous condition may be imminent. Speaker 354 may be utilized to playback voice warnings that a dangerous condition may be imminent. Different pre-alarm messages may be played back over speaker 354 for each type of detected pre-alarm event. For example, if a smoke pre-alarm state is active, a smoke related message may be played back over speaker 354. If a CO pre-alarm state is active, a CO related message may be played back. Furthermore, different messages may be played back for each one of the multiple pre-alarms associated with each hazard (e.g., smoke and CO). For example, the smoke hazard may have two associated pre-alarms, one associated with a first smoke pre-alarming state (e.g., suggesting that an alarming state may be moderately imminent) and another one associated with a second smoke pre-alarming state (e.g., suggesting that an alarming state may be highly imminent). Pre-alarm messages may also include voice instructions on how to hush pre-alarm messages. Display 352 may also be utilized in a similar fashion to provide visual cues of an imminent alarming state. In some embodiments, the pre-alarm messages can specify the location of the pre-alarming conditions. For example, if hazard system 300 knows it is located in the bedroom, it can incorporate the location in the pre-alarm message: "Smoke Detected In Bedroom."

Hazard detection system 300 can enforce alarm and pre-alarm priorities depending on which conditions are present. For example, if elevated smoke and CO conditions exist at the same time, the smoke alarm state and/or pre-alarm smoke state may take precedence over the CO alarm state and/or CO pre-alarm state. If a user silences the smoke alarm or smoke pre-alarm, and the CO alarm state or CO pre-alarm state is still active, system 300 may provide an indication (e.g., a voice notification) that a CO alarm or pre-alarm has also been silenced. If a smoke condition ends and the CO alarm or pre-alarm is event is still active, the CO alarm or pre-alarm may be presented to the user.

Multi-criteria state machines 310 can transition to an idling state when it determines that relatively little or no dangerous conditions exist. The idling state can enforce a relatively low level of hazard detection system activity. For example, in the idle state, the data sampling rates of one or more sensors may be set at relatively slow intervals. Multi-criteria state machines 310 can transition to a monitoring state when it determines that sensor data values have raised to a level that warrants closer scrutiny, but not to a level that transitions to a pre-alarming or alarming state. The monitoring state can imply a relatively high level of hazard detection system activity. For example, in monitoring state, the data sampling rates of one or more sensors may be much greater than in the idle state. In addition, the data sampling rates of one or more sensors may be set at relatively fast intervals for alarming states 330, pre-alarming states 340, or both.

Alarm hushing and pre-alarm hushing states may refer to a user-instructed deactivation of an alarm or a pre-alarm for a predetermined amount of time. For example, in one embodiment, a user can press a button (not shown) to silence an alarm or pre-alarm. In another embodiment, a user can perform a hush gesture in the presence of the hazard detection system. A hush gesture can be a user initiated action in which he or she performs a gesture (e.g., a wave motion) in the vicinity of system 300 with the intent to turn off or silence a blaring alarm. One or more ultrasonic sensors, a PIR sensor, or a combination thereof can be used to detect this gesture.

Post-alarming states may refer to states that multi-criteria state machines 310 can transition to after having been in one of alarming states 330 or one of pre-alarming states 340. In one post-alarming state, hazard detection system 300 can provide an "all clear" message to indicate that the alarm or pre-alarm condition is no longer present. This can be especially useful, for example, for CO because humans cannot detect CO. Another post-alarming state can be a holding state, which can serve as a system debounce state. This state can prevent hazard detection system 300 from immediately transitioning back to a pre-alarming state 340 after having just transitioned from an alarming state 330.

Multi-criteria state machines 310 can include several different state machines: sensor state machines and system state machines. Each state machine can be associated with a particular hazard such as, for example, a smoke hazard, a carbon monoxide hazard, or a heat hazard, and the multi-criteria state machines may leverage data acquired by one or more sensors in managing detection of a hazard. In some embodiments, a sensor state machine can be implemented for each hazard. In other embodiments, a system state machine may be implemented for each hazard or a subset of hazards. The sensor state machines can be responsible for controlling relatively basic hazard detection system functions and the system state machines can be responsible for controlling relatively advanced hazard detection system functions. In managing detection of a hazard, each sensor state machine and each system state machine can transition among any one of its states based on sensor data 302, hush events 304, and transition conditions 306. A hush event can be a user initiated command to hush, for example, a sounding alarm or pre-alarm voice instruction.

Transition conditions 306 can include a myriad of different conditions that may define how a state machine transitions from one state to another. Each state machine can have its own set of transition conditions. The conditions can define thresholds that may be compared against any one or more of the following inputs: sensor data values, time clocks, and user interaction events (e.g., hush events). State change transitions can be governed by relatively simple conditions (e.g., single-criteria conditions), or relatively complex conditions (e.g., multi-criteria conditions). Single-criteria conditions may compare one input to one threshold. For example, a simple condition can be a comparison between a sensor data value and a threshold. If the sensor data value equals or exceeds the threshold, the state change transition may be executed. In contrast, a multi-criteria condition can be a comparison of one or more inputs to one or more thresholds. For example, a multi-criteria condition can be a comparison between a first sensor value and a first threshold and a comparison between a second sensor value and a second threshold. In some embodiments, both comparisons would need to be satisfied in order to effect a state change transition. In other embodiments, only one of the comparisons would need to be satisfied in order to effect a state change transition. As another example, a multi-criteria condition can be a comparison between a time clock and a time threshold and a comparison between a sensor value and a threshold.

In some embodiments, the threshold for a particular transition condition can be adjusted. Such thresholds are referred to herein as adjustable thresholds (e.g., shown as part of transition conditions 306). The adjustable threshold can be changed in response to threshold adjustment parameter 307, which may be provided, for example, by an alarm threshold setting module according to an embodiment. Adjustable thresholds can be selected from one of at least two different selectable thresholds, and any suitable selection criteria can be used to select the appropriate threshold for the adjustable threshold. In one embodiment, the selection criteria can include several single-criteria conditions or a multi-criteria condition. In another embodiment, if the adjustable threshold is compared to sensor values of a first sensor, the selection criteria can include an analysis of at least one sensor other than the first sensor. In another embodiment, the adjustable threshold can be the threshold used in a smoke alarm transition condition, and the adjustable threshold can be selected from one of three different thresholds.

In some embodiments, the threshold for a particular transition condition can be a learned condition threshold (not shown). The learned condition threshold can be the result of a difference function, which may subtract a constant from an initial threshold. The constant can be changed, if desired, based on any suitable number of criteria, including, for example, heuristics, field report data, software updates, user preferences, device settings, etc. Changing the constant can provide a mechanism for changing the transition condition for one or more states (e.g., a pre-alarming state). This constant can be provided to transition conditions 306 to make adjustments to the learned condition threshold. In one embodiment, the constant can be selected based on installation and setup of hazard detection system 300. For example, the home owner can indicate that hazard detection system 300 has been installed in a particular room of an enclosure. Depending on which room it is, system 300 can select an appropriate constant. For example, a first constant can be selected if the room is a bedroom and a second constant can be selected if the room is a kitchen. The first constant may be a value that makes hazard detection system 300 more sensitive to potential hazards than the second constant because the bedroom is in a location that is generally further away from an exit and/or is not generally susceptible to factors that may otherwise cause a false alarm. In contrast, the kitchen, for example, is generally closer to an exit than a bedroom and can generate conditions (e.g., steam or smoke from cooking) that may cause a false alarm. Other installation factors can also be taken into account in selecting the appropriate constant. For example, the home owner can specify that the room is adjacent to a bathroom. Since humidity stemming from a bathroom can cause false alarms, hazard system 300 can select a constant that takes this into account. As another example, the home owner can specify that the room includes a fireplace. Similarly, hazard system 300 can select a constant that takes this factor into account.

In another embodiment, hazard detection system 300 can apply heuristics to self-adjust the constant. For example, conditions may persist that keep triggering pre-alarms, but the conditions do not rise to alarming levels. In response to such persistent pre-alarm triggering, hazard detection system 300 can modify the constant so that the pre-alarms are not so easily triggered. In yet another embodiment, the constant can be changed in response to a software update. For example, a remote server may analyze data acquired from several other hazard detection systems and adjust the constant accordingly, and push the new constant to hazard detection system 300 via a software update. In addition, the remote server can also push down constants based on user settings or user preferences to hazard detection system 300. For example, the home owner may be able to define a limited number of settings by directly interacting with hazard detection system 300. However, the home owner may be able to define an unlimited number of settings by interacting with, for example, a web-based program hosted by the remote server. Based on the settings, the remote server can push down one or more appropriate constants.

The sensor state machines can control alarming states 330 and one or more of other states 320. In particular, smoke sensor state machine 314 can control smoke alarm state 331, CO sensor state machine 316 can control CO alarming state 332, and heat sensor state machine 318 can control heat alarming state 333. For example, smoke sensor state machine 314 may be operative to sound alarm 350 in response to a detected smoke event. As another example, CO sensor state machine 316 can sound alarm 350 in response to a detected CO event. As yet another example, heat sensor state machine 318 can sound alarm 350 in response to a detected heat event. In some embodiments, a sensor state machine can exercise exclusive control over one or more alarming states 330.

The system state machines can control pre-alarming states 340 and one or more of other states 320. In particular, smoke system state machine 315 may control smoke pre-alarm state 341, and CO system state machine 317 may control CO pre-alarm state 342. In some embodiments, each system state machine can manage multiple pre-alarm states. For example, a first pre-alarm state may warn a user that an abnormal condition exists, and a second pre-alarm state may warn the user that the abnormal condition continues to exist. Moreover, each system state machine can manage other states that cannot be managed by the sensor state machines. For example, these other states can include a monitoring state, a pre-alarm hushing state, and post-alarm states such as holding and alarm monitoring states.

The system state machines can co-manage one or more states with sensor state machines. These co-managed states ("shared states") can exist as states in both system and sensor state machines for a particular hazard. For example, smoke system state machine 315 may share one or more states with smoke sensor state machine 314, and CO system state machine 317 may share one or more states with CO sensor state machine 316. The joint collaboration between system and sensor state machines for a particular hazard is shown by communications link 370, which connects the two state machines. In some embodiments, any state change transition to a shared state may be controlled by the sensor state machine. For example, the alarming state may be a shared state, and anytime a sensor state machine transitions to the alarming state, the system state machine that co-manages states with that sensor state machine may also transition to the alarming state. In some embodiments, shared states can include idling states, alarming states, and alarm hushing states. The parameters by which multi-criteria state machines 310 may function are discussed in more detail in connection with the description accompanying FIGS. 4A-8B of U.S. Provisional Patent Application No. 61/847,937.

Figure 4:
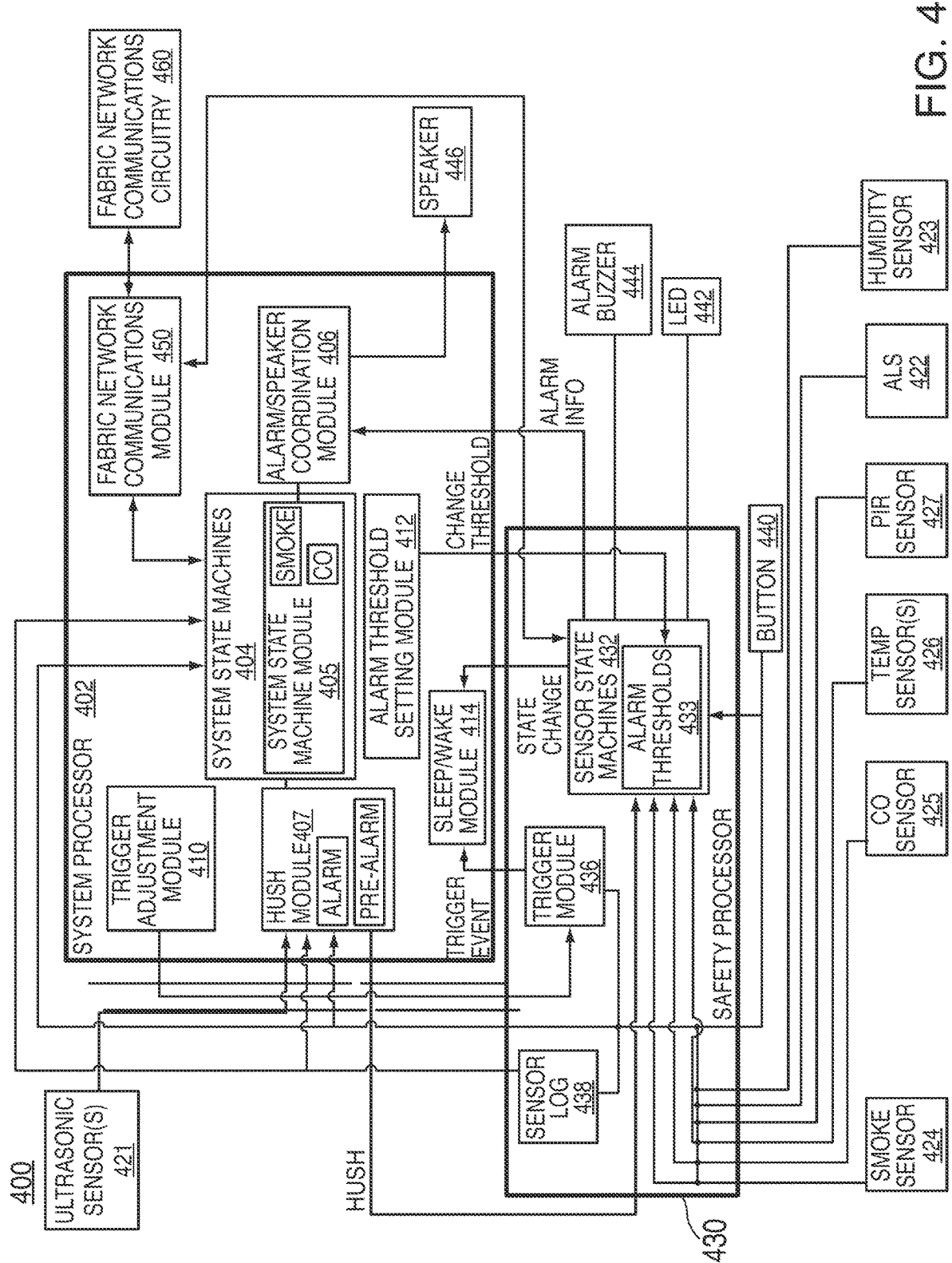
FIG. 4 shows an illustrative schematic of a hazard detection system, according to some embodiments.

FIG. 4 shows an illustrative schematic of hazard detection system 400 according to an embodiment and shows, among other things, signal paths among various components, state machines, and illustrative modules being executed by different processors. System 400 can include system processor 402, safety processor 430, ultrasonic sensors 421, ALS sensor 422, humidity sensor 423, smoke sensor 424, CO sensor 425, temperatures sensors 426, and PIR sensor 427, button 440, LED(s) 442, alarm 444, speaker 446, fabric network communications module 450, and fabric network communications circuitry 460. System processor 402 can be similar to system processor 210 of FIG. 2. System processor 402 can operate system state machines 404, system state machine module 405, alarm/speaker coordination module 406, hush module 407, trigger adjustment module 410, and sleep/wake module 414. System state machines 404 can access system state machine module 405, alarm/speaker coordination module 406, and hush module 407 in making state change determinations. System processor 402 can receive data values acquired by ultrasonic sensors 421 and other inputs from safety processor 430. System processor 402 may receive data from sensors 422-427, data from sensor log 438, trigger events from trigger module 436, state change events and alarm information from sensor state machines 432, and button press events from button 440.

Safety processor 430 can be similar to safety processor 230 of FIG. 2. Safety processor 430 can operate sensor state machines 432, alarm thresholds 433, trigger module 436, and sensor log 438. Safety processor 430 can control operation of LEDs 442 and alarm 444. Safety processor 430 can receive data values acquired by sensors 422-427 and button 440. All or a portion of acquired sensor data can be provided to sensor state machines 432. For example, as illustrated in FIG. 4, smoke, CO, and heat sensor data is shown being directly provided to sensor state machines 432. Sensor log 438 can store chunks of acquired data that can be provided to system processor 402 on a periodic basis or in response to an event such as a state change in one of sensor state machines 432 or a trigger event detected by trigger module 436. In addition, in some embodiments, even though the sensor data may be stored in sensor log 438, it can also be provided directly to system processor 402, as shown in FIG. 4.

Alarm thresholds 433 can store the alarming thresholds in a memory (e.g., Flash memory) that is accessible by sensor state machines 432. As discussed above, sensor state machines 432 can compare monitored sensor data values against alarm thresholds 433 that may be stored within safety processor 430 to determine whether a hazard event exists, and upon determining that the hazard event exists, may cause the alarm to sound. Each sensor (e.g., smoke sensor, CO sensor, and heat sensor) may have one or more alarm thresholds. When multiple alarm thresholds are available for a sensor, safety processor 430 may initially select a default alarm threshold, but responsive to an instruction received from system processor 402 (e.g., from Alarm/Pre-Alarm Threshold Setting Module 412), it can select one of the multiple alarm thresholds as the alarm threshold for that sensor. Safety processor 430 may automatically revert back to the default alarm threshold if certain conditions are not met (e.g., a predetermined period of time elapses in which an alarm setting threshold instruction is not received from system processor 402).

Safety processor 430 and/or system processor 402 can monitor button 440 for button press events. Button 440 can be an externally accessible button that can be depressed by a user. For example, a user may press button 440 to test the alarming function or to hush an alarm. Safety processor 430 can control the operation of alarm 444 and LEDs 442. Processor 430 can provide alarm information to alarm/speaker coordination module 406 so that module 406 can coordinate speaker voice notification with alarm sounds. In some embodiments, safety processor 430 is the only processor that controls alarm 444. Safety processor 430 can also receive inputs from system processor 402 such as hush events from hush module 407, trigger band boundary adjustment instructions from trigger adjustment module 410, and change threshold instructions from alarm/pre-alarm threshold setting module 412.

As shown, hazard detection system 400 may use a bifurcated processor arrangement to execute the multi-criteria state machines to control the alarming and pre-alarming states, according to various embodiments. The system state machines can be executed by system processor 402 and the sensor state machines can be executed by safety processor 430. As shown, sensor state machines 432 may reside within safety processor 430. This shows that safety processor 430 can operate sensor state machines such as a smoke sensor state machine, CO sensor state machine, and heat sensor state machine. Thus, the functionality of the sensor state machines (as discussed above) are embodied and executed by safety processor 430. As also shown, system state machines 404 may reside within system processor 402. This shows that system processor 402 can operate system state machines such as a smoke system state machine and a CO system state machine. Thus, the functionality of the system state machines (as discussed above) are embodied and executed by system processor 402.

In the bifurcated approach, safety processor 430 can serve as the "brain stem" of hazard detection system 400 and system processor 402 can serve as the "frontal cortex." In human terms, even when a person goes to sleep (i.e., the frontal cortex is sleeping) the brain stem maintains basic life functions such as breathing and heart beating. Comparatively speaking, safety processor 430 is always awake and operating; it is constantly monitoring one or more of sensors 422-427, even if system processor 402 is asleep or non-functioning, and managing the sensor state machines of hazard detection system 400. When the person is awake, the frontal cortex is used to processes higher order functions such as thinking and speaking Comparatively speaking, system processor 402 performs higher order functions implemented by system state machines 404, alarm/speaker coordination module 406, hush module 407, trigger adjustment module 410, and alarm/pre-alarm threshold setting module 412. In some embodiments, safety processor 430 can operate autonomously and independently of system processor 402. Thus, in the event system processor 402 is not functioning (e.g., due to low power or other cause), safety processor 430 can still perform its hazard detection and alarming functionality.

The bifurcated processor arrangement may further enable hazard detection system 400 to minimize power consumption by enabling the relatively high power consuming system processor 402 to transition between sleep and non-sleep states while the relatively low power consuming safety processor 430 is maintained in a non-sleep state. To save power, system processor 402 can be kept in the sleep state until one of any number of suitable events occurs that wakes up system processor 402. Sleep/wake module 414 can control the sleep and non-sleep states of system processor 402. Safety processor 430 can instruct sleep/wake module 414 to wake system processor 402 in response to a trigger event (e.g., as detected by trigger module 436) or a state change in sensor state machines 432. Trigger events can occur when a data value associated with a sensor moves out of a trigger band associated with that sensor. A trigger band can define upper and lower boundaries of data values for each sensor and are stored with safety processor 430 in trigger module 436. Trigger module 436 can monitor sensor data values and compare them against the boundaries set for that particular sensor's trigger band. Thus, when a sensor data value moves out of band, trigger module 436 registers this as a trigger event and notifies system processor 402 of the trigger event (e.g., by sending a signal to sleep/wake module 414).

The boundaries of the trigger band can be adjusted by system processor 402, when it is awake, based on an operational state of hazard detection system 400. The operational state can include the states of each of the system and sensor state machines, sensor data values, and other factors. System processor 402 may adjust the boundaries of one or more trigger bands to align with one or more system state machine states before transitioning back to sleep. Thus, by adjusting the boundaries of one or more trigger bands, system processor 402 effectively communicates "wake me" instructions to safety processor 430. The "wake me" instructions can be generated by trigger adjustment module 410 and transmitted to trigger module 436, as shown in FIG. 4. The "wake me" instructions can cause module 436 to adjust a boundary of one or more trigger bands.

Fabric network communications module 450 may be operative to control a fabric network activation process and dissemination of fabric messages according to various embodiments. Module 450 can communicate with state machines 404 and 432 and with fabric network communications circuitry 460. Module 450 may generate the wake packets and fabric messages that are broadcasted by communications circuitry 460. Fabric network communications circuitry 460 may be operative to broadcast and receive data (including wake packets and fabric messages). In one embodiment, circuitry 460 can be similar to low power circuitry 214 of FIG. 2. Although not shown in FIG. 4, communications circuitry 460 can optionally communicate directly with safety processor 430.

Figure 5:
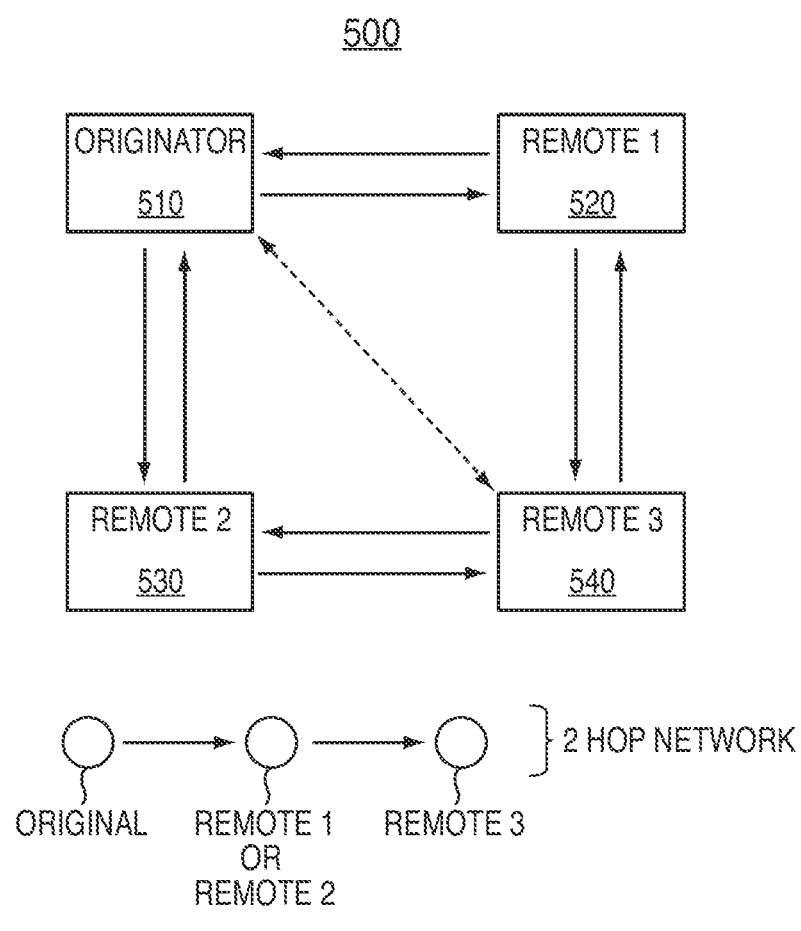
FIG. 5 shows an illustrative schematic of fabric network, according to an embodiment.

FIG. 5 shows an illustrative schematic of fabric network 500 according to an embodiment. Fabric network 500 can include two or more devices capable of wirelessly communicating with each other using one or more different communications protocols. The communications protocols can include, for example, Internet Protocol version 6 (IPv6). The devices of network 500 may be positioned throughout an enclosure, for example, such as a house or building. Depending on the positioning of the devices within the structure and interference elements existing therein, some devices may not be able to directly communicate with each other. For example, as shown in FIG. 5, device 510 can communicate directly with devices 520 and 530 (as indicated by the solid lines), but may not communicate directly with device 540 (as indicated by the dashed line). Device 510 may indirectly communicate with device 540 via either device 520 or 530 because devices 520 and 530 may communicate directly with device 540 (as shown by the solid lines). Personal device 550 may not exist as part of fabric network 500, but may be able to communicate with any one of devices 510, 520, 530, and 540. Personal device 550 can be, for example, a device a user can carry in a pocket or purse, or wear. Various embodiments discussed herein describe how a user can interact with personal device 550 to instruct one of devices 510, 520, 530, and 540 to change its state prior to the end of a fabric network "wake" sequence, thereby enabling a user to rapidly respond to events.

Fabric network 500 may represent a multi-hop network in which at least one device serves as a retransmission station for relaying a message received from an originator device to a destination device because the originator and destination devices are not able to directly communicate with each other. The number of hops needed may depend on a number of factors such as the size of the network, the ability of device to communicate with each other, etc. Fabric network 500 may represent a two-hop network: the first hop exists between device 510 and device 520 or device 530, and the second hop exists between device 520 or 530 and device 540. If, for example, devices 510 and 540 could directly communicate with other, then fabric network 500 would be a single-hop network.

Devices 510, 520, 530, and 540 have been labeled as Originator, Remote 1 (R1), Remote 2 (R2), and Remote 3 (R3). These designations may be referred to herein throughout to indicate which device serves as an originator of a communication and which devices serve as recipients of the originator's message. The originator, as its name implies, is the device that initiates a fabric communication in response to conditions it is monitoring, and messages broadcasted by the originator are distributed to remote devices so that the remote devices can take the appropriate actions in response to the message broadcasted by the originator. The remote devices may transmit messages in response to the originator's message(s), but the originator decides whether to abide by the remote device's message. For example, the originator initiates a fabric communication by informing the remote devices that it is experiencing a smoke alarm. In response to receiving the smoke alarm message, the remote devices take an appropriate action (e.g., provide audible cues that a smoke alarm exists or start sounding an alarm). A remote device may broadcast a request to hush the alarm. The originator device, upon receiving the request, determines whether to hush the alarm. If hush conditions are satisfied, the originator may broadcast a new message that contains a hush instruction. It should be understood that the remote devices do not always blindly follow the originator device. For example, there may be instances where an originator device broadcast an "all clear" message (signifying that no conditions exist at the originator device), but one of the remote devices may be independently detecting an alarm condition. That remote device would not cease alarming or change its operational state in response to the originator's message, but it may acknowledge that the originator is "all clear".

As will be explained in more detail below, a fabric communication may include two parts: 1) waking up devices in the network and 2) transmitting a message after the devices have been woken up. If the devices in the fabric network have already been woken up, then the fabric communication may only include part 2, the transmission of a message. Devices within a fabric network may need to be woken up because they spend a majority of their operational life in a low-power, sleep mode.

Figure 6:
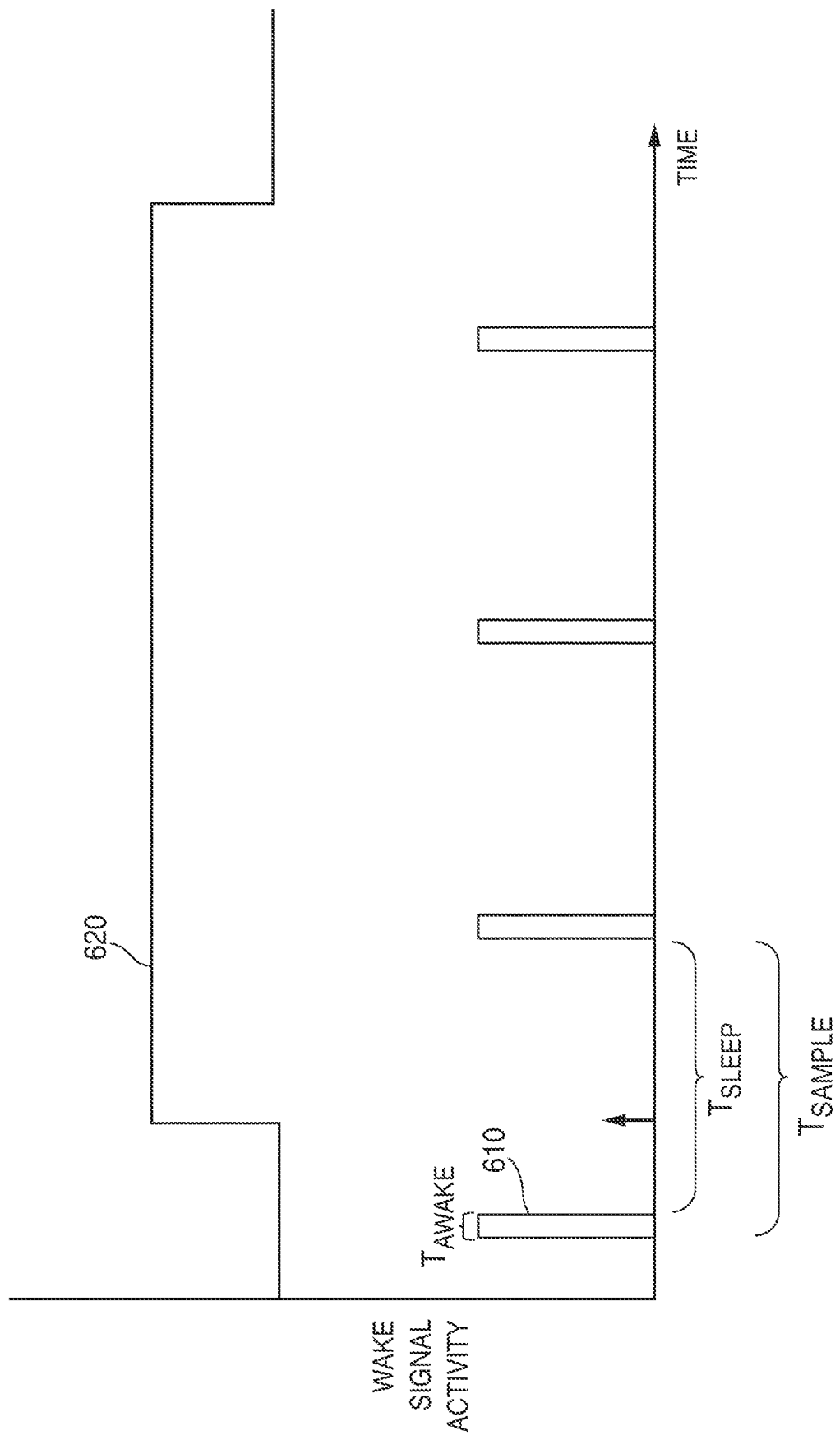
FIG. 6 shows illustrative timing diagrams, according to an embodiment.

FIG. 6 shows illustrative timing diagrams according to an embodiment. In particular, FIG. 6 shows sleep cycle waveform 610 of a device (e.g., any one of devices 510, 520, 530, or 540) and total wake signal waveform 620. Waveform 610 has period, $T_{SAMPLE}$, which includes an awake portion ($T_{Awake}$) and a sleep portion ($T_{sleep}$). Thus, for each period, the device temporarily wakes up to check whether there is an ongoing wake activity in the fabric. Each device operating within a fabric network may operate according to waveform 610. When an originator device is instructed to wake up other devices in the network, the originator device may broadcast its wake signal message for the length of total wake signal waveform 620 to provide sufficient time for the wake signal to propagate through the fabric network to wake one or more devices within the network. The wake signal is designed to terminate at the same time across the network, and at the end of the wake signal all the devices across the fabric must be awake with high probability. To ensure these properties, the time duration of total wake signal waveform 620 must exceed the product of the number of hops in the fabric network and $T_{SAMPLE}$.

Figure 7:
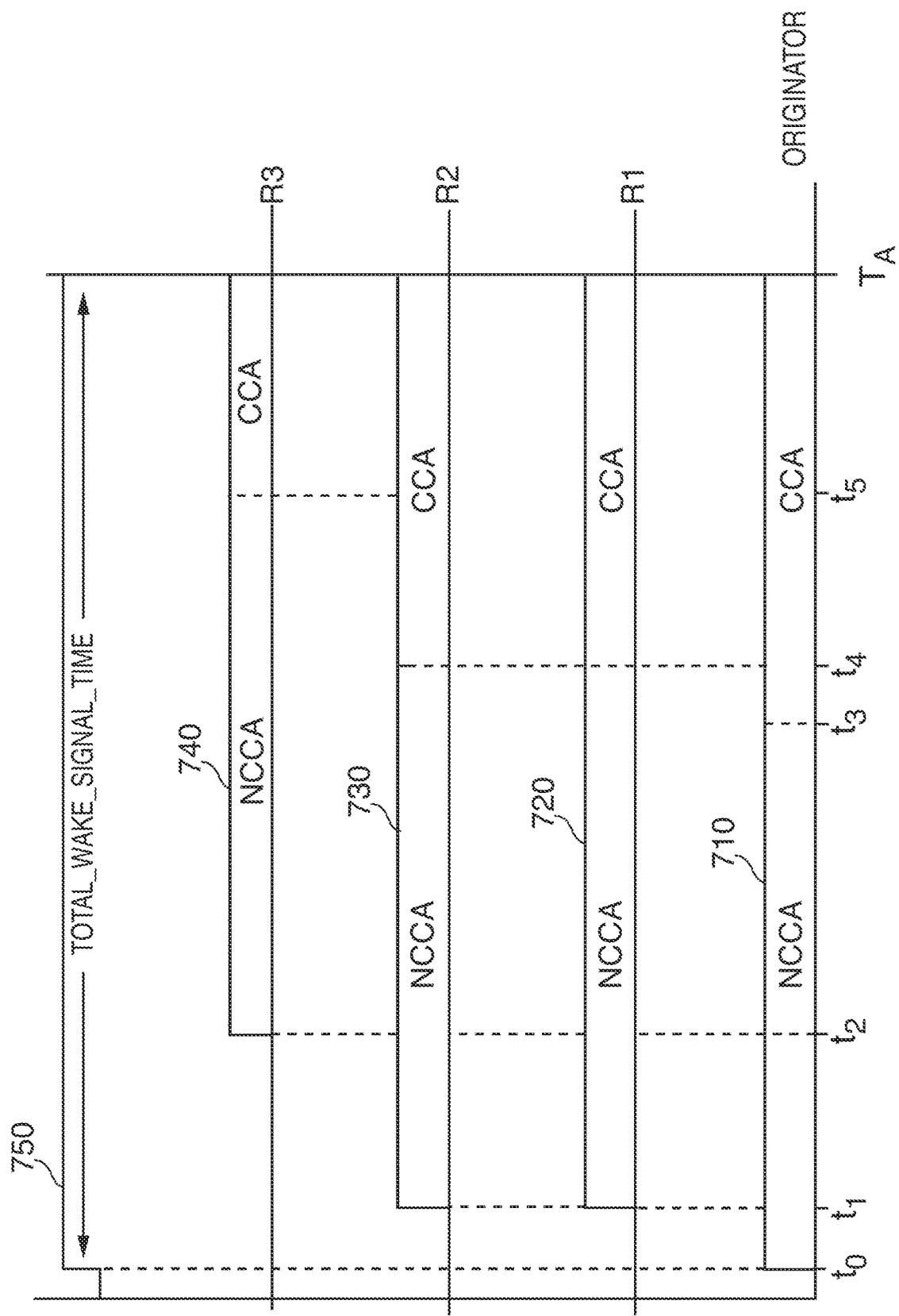
FIG. 7 shows illustrative wake signal waveforms for each device of FIG. 5, according to an embodiment.

FIG. 7 shows illustrative wake signal waveforms for each device of FIG. 5 according to an embodiment. As shown, waveforms 710, 720, 730, and 740 may correspond to the wake signal broadcasted by devices 510, 520, 530, and 540, respectively. Multiple wake packets may be broadcasted by a device during assertion of the wake signal. FIG. 7 also shows an illustrative total wake signal waveform 750, which has total wake signal time period, $T_{total\_wake\_signal\_time}$, beginning at time, $t_0$, and ending at time, $T_4$. After time, $T_4$, the devices may be fully awake and capable of communicating using another communication circuit. For example, the devices may begin communicating with a server using Wi-Fi communications circuitry. Using such circuitry, the devices may be able to communicate with a personal device such as device 550. In addition, device 550 may be able to communicate with one of the devices using the same communications circuitry (e.g., Wi-Fi communications circuitry) after the devices are frilly awake. Embodiments discussed herein describe how a device can communicate with a personal device prior to time, $T_4$, thereby enabling a user to communicate with the originator device even though the conventional, general purpose communication circuitry is not yet online for conducting communications.

Figure 8:
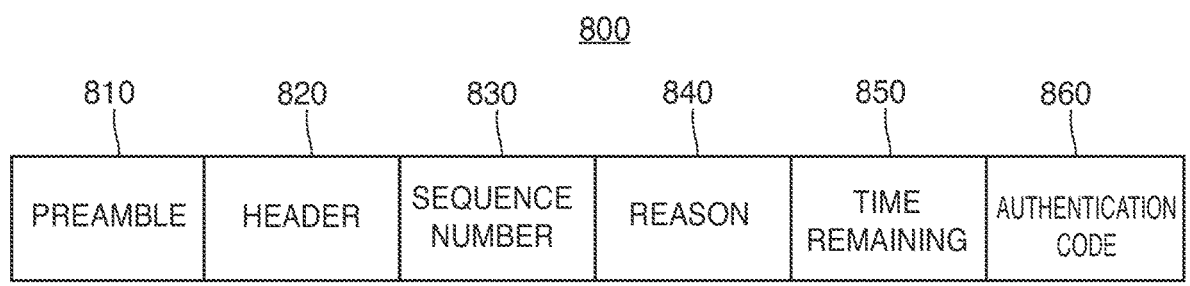
FIG. 8 shows an illustrative wake packet including several fields, according to an embodiment.

FIG. 8 shows an illustrative wake packet 800 including several fields according to an embodiment. As shown, wake packet 800 may include preamble field 810, header field 820, sequence number field 830, reason field 840, time remaining field 850, and authentication code field 860. Wake packet 800 may include additional fields (not shown). Preamble and header fields 810 and 820 may contain information pertaining to the identification and organization of the packet. Sequence number field 830 may specify a sequence number that is globally unique across the fabric network for the lifetime of every device in the network. Thus, an originally broadcasted wake packet may contain a first sequence number and any rebroadcast of that same wake packet may also contain the first sequence number. Maintaining the sequence number may enable devices within the fabric network to keep track of wake packets being propagated through the network.

Figure 9:
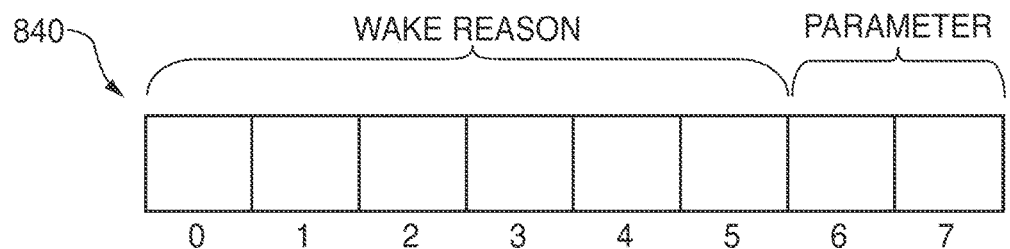
FIG. 9 shows a more detailed illustration of one of the fields of the packet of FIG. 8, according to an embodiment.

Reason field 840 may include a wake reason and parameters associated with the wake reason. FIG. 9 shows a more detailed illustration of reason field 840, according to an embodiment. As shown, reason field 840 can be a multi-bit field designed to have a first number of bits designated for wake reasons and a second number of bits designated for wake reason parameters. The wake reasons can include diagnostic tests (e.g., device specific test), network tests (e.g., network test that do not depend on the fabric network being formed), safety alarms (e.g., alarms that cause the fabric network to wake up, with further updates to follow in a fabric message), non-safety alarms (e.g., to denote pre-alarm states of an alarm or to denote security conditions), and emergency alarms (e.g., alarms generated outside of the fabric network that require activation of the fabric network). Some wake reasons may be sufficient for disseminating the appropriate message independent of a follow on fabric message. Other wake reasons may be intended to be more generic than the reason provided as part of a follow on fabric message, but the wake reason may be sufficient to enable appropriate action by devices receiving the message (e.g., cause remote devices to change a state in their respective state machine). The wake reason parameters may define one or more parameters of the wake reason. For example, for a diagnostics test, the parameters may specify what to test. For an alarm reason, the parameters may convey additional information about the alarm.

The parameter time remaining field 850 may specify the amount of time remaining for the total wake signal time period, $T_{total\_wake\_signal\_time}$. An initial broadcast of a wake packet from an originator device may specify a maximum time period for $T_{total\_wake\_signal\_time}$, but the $T_{total\_wake\_signal\_time}$ may be decremented for each subsequent rebroadcast of that same wake packet. For example, referencing FIG. 7, at time to, the $T_{total\_wake\_signal\_time}$ may be $T_A$-$t_0$, but at time $t_1$, the $T_{total\_wake\_time\_remaining}$ may be $T_A$-$t_1$, resulting in a time decrement of $t_1$-$t_0$. Authentication code field 860 may include an authentication code that is used to ensure secured wake packet transmission and reception. In some embodiments, the authentication code can be based on the sequence number, reason, and time remaining.

Referring now to FIGS. 5-8, collectively, each wake waveform 710, 720, 730, and 740 can broadcast wake packets in a non-clear channel assessment (NCCA) mode and a clear channel assessment (CCA) mode. The NCCA mode precedes the CCA mode such that the wake signal for any device includes a NCCA portion followed by a CCA portion. The NCCA and CCA portions of each wake waveform are clearly marked in FIG. 7. The time duration of the NCCA portion may be fixed, and is referred to herein as $T_{NCCA}$. In some embodiments, $T_{NCCA}$ may exceed $T_{SAMPLE}$; in some embodiments, $T_{NCCA}$ may be set to twice the duration of $T_{SAMPLE}$. The time duration of the CCA portion may be variable, and is referred to herein as $T_{CCA}$. In some embodiments, $T_{CCA}$ may be equal to the difference of $T_A$ and $T_{NCCA}$.

In the NCCA mode, the device may repeatedly broadcast its wake packets, irrespective of the state of the communication channel. Thus, in this mode, there is a possibility that wake packets may saturate the fabric network, as more than one device may be simultaneously broadcasting in the NCCA mode. For example, FIG. 7 shows that all four devices are broadcasting wake packets in the NCCA mode between times $t_2$ and $t_3$.

In the CCA mode, the device may first determine whether any other device is communicating on a channel before attempting to broadcast a wake packet. In effect, devices operating in CCA mode race each other to determine who broadcasts.

Starting at time, $t_0$, the originator device begins transmitting wake packets. Also at time, $t_0$, total wake signal waveform 750 commences. The originator device transmits wake packets in NCCA mode from time, $t_0$ to $t_1$, during which time remote devices 1 and 2 are awakened and they begin transmitting wake packets at time, $t_1$. The originator device continues to broadcast in NCCA mode until time, $t_3$, and the first and second devices broadcast in NCCA mode until time, $t_4$. When device 3 wakes up at time, $t_2$, it begins transmitting in NCCA mode until time, $t_5$. Note that the $T_{CCA}$ time for each device progressively shrinks the later a device is awoken. Even though all four devices are awake at time, $t_2$, they continue broadcasting wake packets until time, $T_A$, at which point all of the devices are awake and ready to communicate fabric messages.

Figure 10:
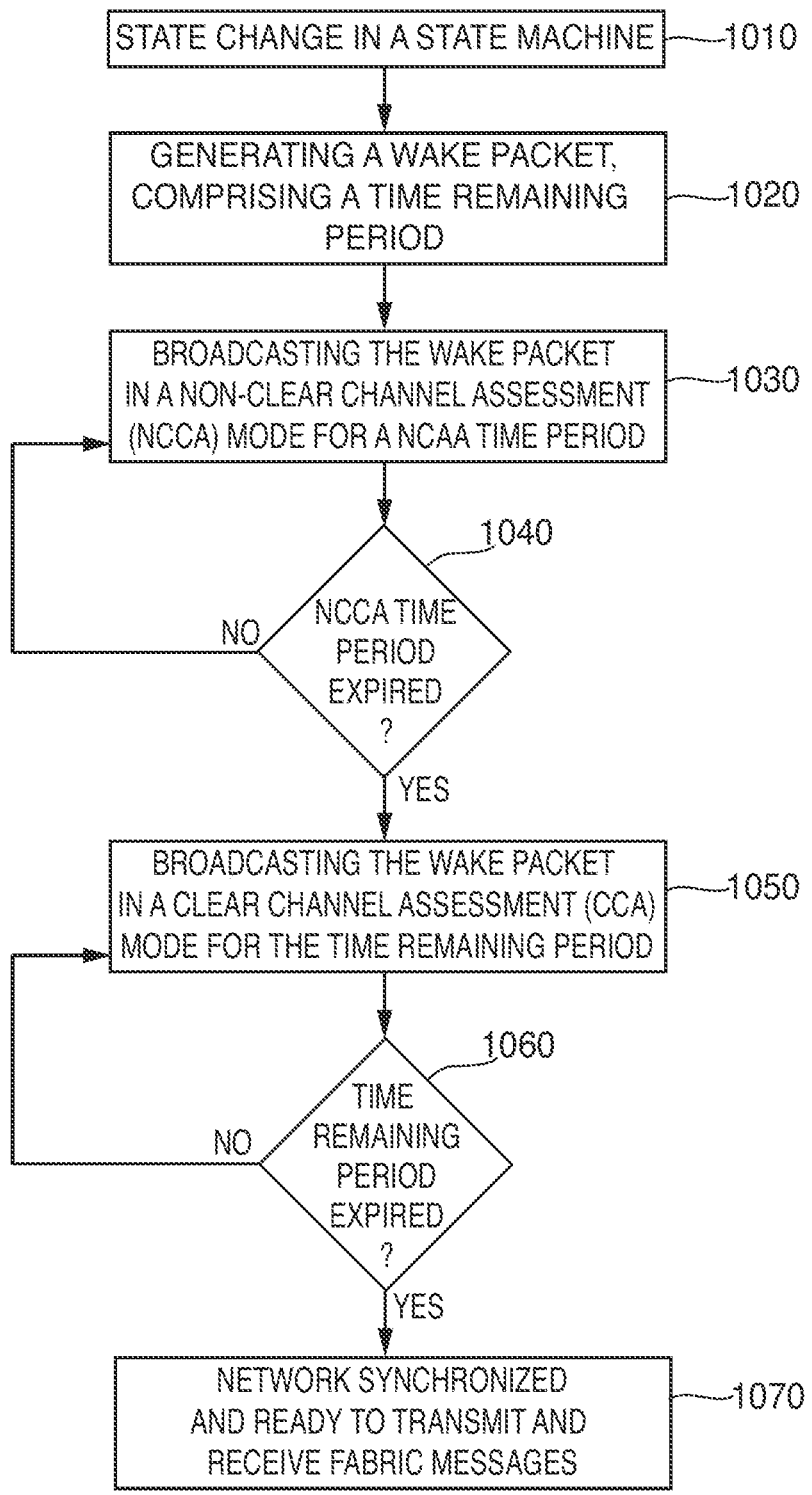
FIG. 10 shows an illustrative flowchart, according to an embodiment.

FIG. 10 shows an illustrative flowchart of steps that may be performed as part of process 1000 according to embodiment. More particularly, process 1000 may illustrate steps taken by an originator device (e.g., device 510 of FIG. 5) that initiates a fabric network wake event. Starting with step 1010, an indication of a state change in a state machine may be received. For example, one of the state machines of FIG. 3 may have changed from an IDLE state to an ALARM state. Responsive to the state change, a wake packet may be generated, at step 1020. The wake packet can be similar to wake packet 800 of FIG. 8, and can include a reason and $T_{wake\_time\_remaining}$, among other populated packet fields. In some embodiments, the reason can specify which state machine experienced the state change, and can include the new state of that state machine. For example, if the smoke sensor state machine changed to an Alarm state, the reason can include the smoke state machine and the Alarm state. It should be understood that events other than state change events may trigger an awakening of a fabric network. For example, a device may decide to run diagnostics or network tests, either of which may result in the generation of a wake packet that specifies the appropriate reason.

At step 1030, the wake packet may be broadcasted in a NCCA mode for a NCCA time period. For example, in FIG. 7, the originator device may begin broadcasting wake packets in NCCA mode at time, $t_0$. In addition, $T_{wake\_time\_remaining}$, begins at time, $t_0$, and is set to end at time, $T_A$. The originator device may continue to broadcast wake packets in the NCCA mode until the NCCA time period expires, at step 1040. It is understood that the $T_{wake\_time\_remaining}$ of each packet is adjusted as appropriate to account for the passage of time. In FIG. 7, the NCCA time period for the originator expires at time $t_3$. After the NCCA time period expires, the wake packets (with appropriately adjusted $T_{wake\_time\_remaining}$) may be broadcasted by the originator in a CCA mode for the remainder of $T_{wake\_time\_remaining}$, as indicated by step 1050. Thus, from time $t_3$ to $T_4$, the originator device may broadcast wake packets in the CCA mode. When the $T_{wake\_time\_remaining}$ expires at step 1060, the fabric network may be synchronized and ready to transmit and receive fabric message packets, as indicated by step 1070.

Figure 11:
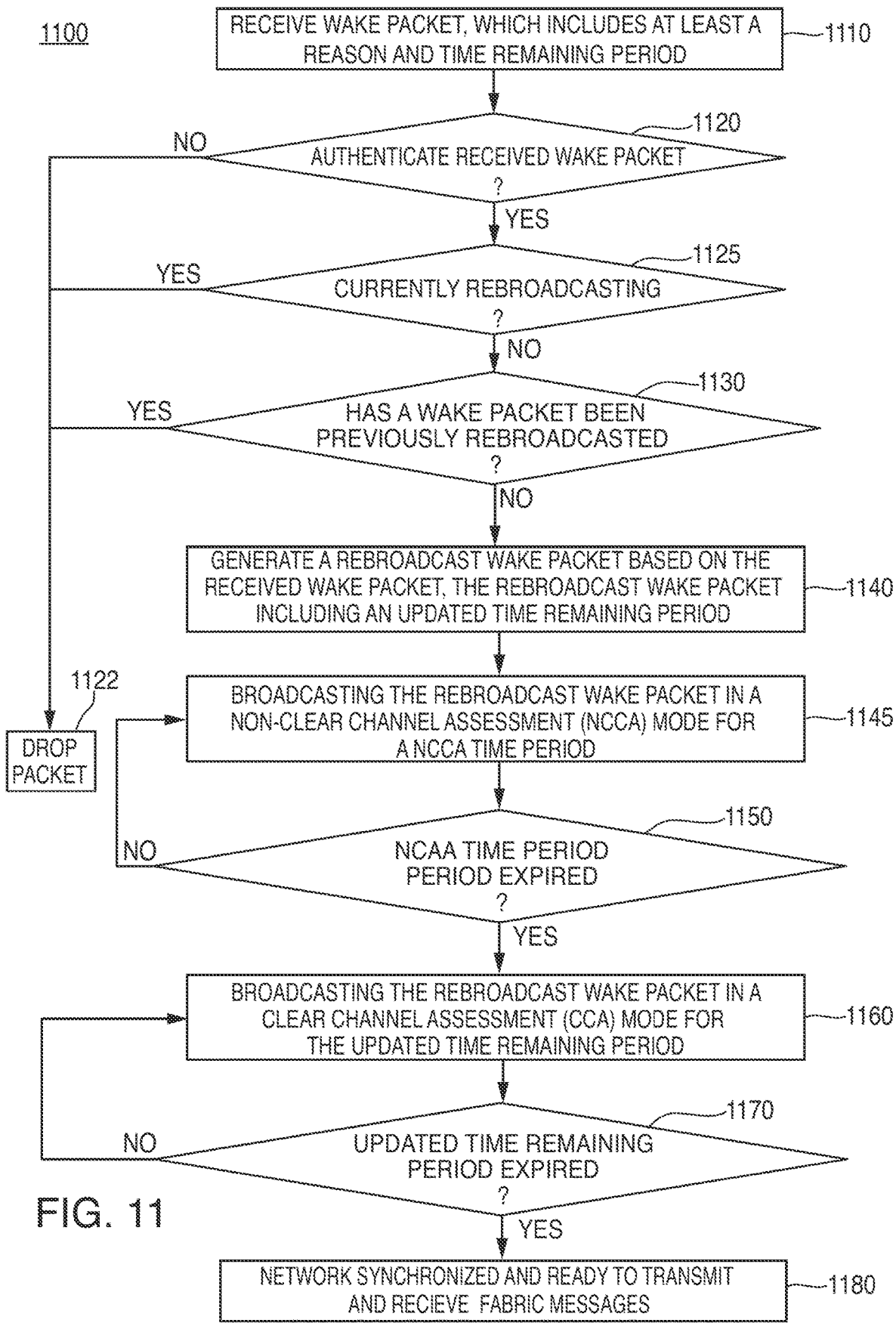
FIG. 11 shows another illustrative flowchart, according to embodiment.

FIG. 11 shows an illustrative flowchart of steps that may be performed as part of process 1100 according to embodiment. More particularly, process 1100 may illustrate steps taken by a remote device (e.g., any one of devices 520, 530, and 540 of FIG. 5) that receives a wake packet. Starting with step 1110, a wake packet may be received. The wake packet may be similar to packet 800 of FIG. 8 and includes at least a reason and $T_{wake\_time\_remaining}$. At step 1120, the received wake packet is authenticated. If the packet is not authenticated, it may be dropped at step 1122.

If the packet is authenticated, process 1100 may determine whether the device is currently rebroadcasting at step 1125. If the device is currently rebroadcasting, the received wake packet may be dropped at step 1122. If the device is not currently rebroadcasting, process 1100 may determine whether the device has already rebroadcasted the received wake packet at step 1130. To determine whether the device has already rebroadcasted the received wake packet, the device may compare components of the received wake packet (e.g., reason for wake, sequence number, source address, etc.) with components of wake packets previously rebroadcasted by the device for a match. If the determination at step 1130 is YES, process 1100 may drop the packet as indicated by step 1122. If the determination at step 1130 is NO, process 1100 may generate a rebroadcast wake packet based on the received wake packet. The rebroadcast wake packet may be a packet resembling packet 800. It may include the same sequence number and reason as the received wake packet, but may include an updated $T_{wake\_time\_remaining}$. At step 1145, the rebroadcast wake packet may be broadcasted in the NCCA mode for an NCCA time period. As explained above, adjustments are made to the updated $T_{wake\_time\_remaining}$ to reflect passage of time. In FIG. 7, both R1 and R2 devices begin broadcasting rebroadcast wake packets at time, $t_1$, in the NCCA mode and continue to broadcast in the NCCA mode until time, $t_4$. R3 may begin broadcasting rebroadcast wake packets at time $t_2$, in response to receiving a rebroadcast packet from one of device R1 and R2. Device R3 may broadcast in the NCCA mode for a NCCA time period before switching to a CCA mode at time, $t_5$. When the NCCA time period expires at step 1150, process 1100 may proceed to step 1160.

At step 1160, the rebroadcast wake packets may be broadcasted in a CCA mode for the remainder of the updated $T_{wake\_time\_remaining}$. For example, between times $t_4$ and $t_5$, device R1 may receive rebroadcast wake packets from device R3, but because device R1 has already concluded its NCCA mode broadcasts, it will not transition back into NCCA mode. It may rebroadcast, however, in the CCA mode. After the updated $T_{wake\_time\_remaining}$ expires, as determined at step 1170, the devices in the fabric network may be synchronized and ready to transmit and receive fabric message packets (step 1180). FIG. 7 illustrates how the wake sequence propagates across fabric network 500 so that each device is synchronized and ready to transmit and receive fabric message packets by time, $T_4$. Further note that because time, $T_4$, is fixed relative to the originator initial wake packet transmission, the CCA period of devices that wake up later than the originator device may be less than the CCA period of the originator device.

Figure 12:
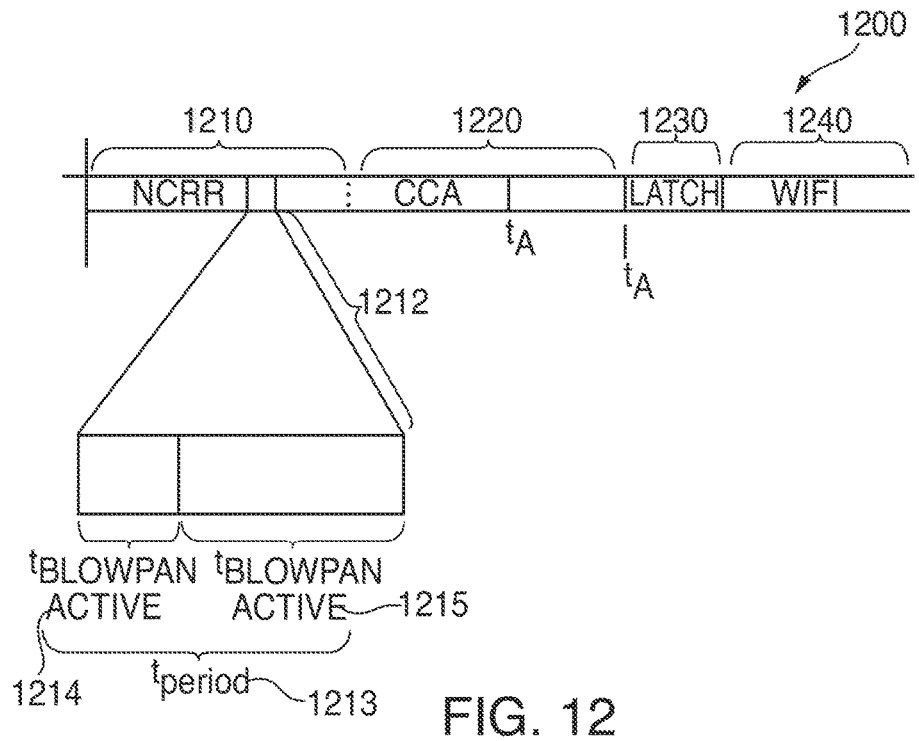
FIG. 12 shows an illustrative timing diagram of a lone device that forms part of a fabric network, according to an embodiment.

FIG. 12 shows illustrative timing diagram 1200 of a lone device that forms part of a fabric network. As shown, timing diagram 1200 includes NCAA period 1210, CCA period 1220, latch period 1230, and Wi-Fi active period 1240. CCA period 1220 may end at time, $T_4$, which may signify that the fabric network is awake. Also, at time, $T_4$, the device latches at latch period 1230, after which the device's Wi-Fi circuitry is active and capable of performing communications. Wake packets may be broadcasted during NCCA period 1210 and CCA period 1220. Only one such wake packet is shown (as packet 1212) within NCCA period 1210 to avoid overcrowding the drawing. In addition, a magnified view of packet 1212 is also illustrated to better show timing components of the wake packet. Wake packet 1212 may be transmitted using one of the device's communications circuitry. In one embodiment, a 6LOWPAN communications circuitry may transmit wake packets. Each wake packet transmission may be characterized by a wake packet transmission period 1213. Wake packet transmission period 1213 may include active portion 1214 and idle portion 1215. Data representing the wake packet may be transmitted during active portion 1214. Idle portion 1215 may represent downtime during which the 6LOWPAN communications circuitry is not actively transmitting any data.

It is during idle portion 1215 of a wake packet transmission that another communication circuit can communicate with an out of fabric network device such as a personal device. For example, Bluetooth communications circuitry can communicate with the personal device during the idle portion of a wake packet transmission. In one embodiment, the Bluetooth communications circuitry may communicate using a Bluetooth Low Energy (BLE) communications protocol during the idle portion. Thus, by providing a co-existing communications link (e.g., the BLE link) with the personal device during the idle portion of the wake packet transmission, a user may be able to transmit instructions in a reliable, low latency manner to the device prior to a latch period during which the device activates another communications circuit (e.g., Wi-Fi circuitry).

Since wake packets are being transmitted by a first communications circuit (e.g., 6LOWPAN) and the BLE packets are being transmitted by a second communications circuit (e.g., Bluetooth) in close time proximity of each other, co-existence circuitry may manage the transmission of the wake and BLE packets to avoid collisions. In some embodiments, both the first and second communications circuits may share the same antenna or operate on the same frequency, thereby further requiring the use of co-existence circuitry to prevent collisions. Further still, operation of a third communications circuit (e.g., Wi-Fi circuitry) may need to avoid collisions with the first and second communications circuits as it may share the same RF medium. In some embodiments, the third communications circuit may serve as the co-existence manager of all three communication circuits.

Figure 13:
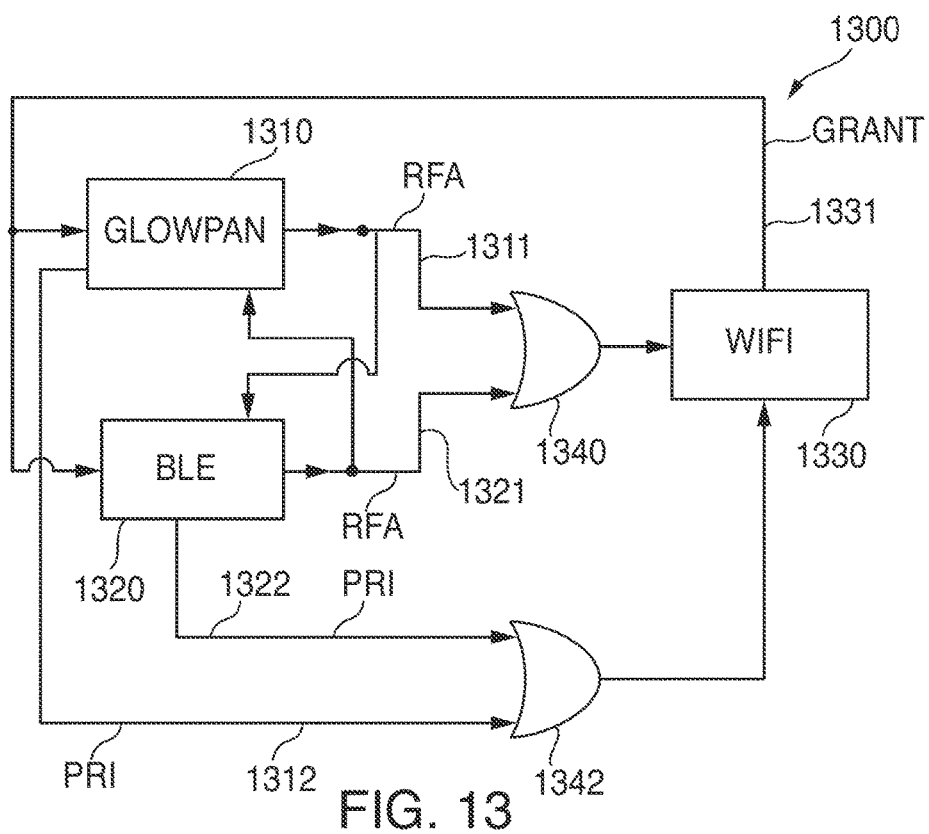
FIG. 13 shows an illustrative co-existence circuit for managing operations of three communications circuits, according to an embodiment.

FIG. 13 shows an illustrative co-existence circuit 1300 for managing operations of three communications circuits, according to an embodiment. As shown, circuitry 1300 includes 6LOWPAN circuitry 1310, BLE circuitry 1320, Wi-Fi circuitry 1330, and OR gates 1340 and 1342. Request for Access (RFA) line 1311 may be connected to BLE circuitry 1320 and an input of OR gate 1340. An RFA line may be asserted by a communication circuit when it requires access to an RF medium. An RF medium can include an antenna and/or a communications frequency. RFA line 1321 may be connected to 6LOWPAN circuitry 1310 and an input of OR gate 1340. The output of OR gate 1340 may be connected to Wi-Fi circuitry 1330. Priority Line 1312 may be connected to an input of OR gate 1342, and priority line 1322 may be connected to an input of OR gate 1342. A priority line may be asserted by a communication circuit that is requesting high priority access to the RF medium. The output of OR gate 1342 may be connected to Wi-Fi circuitry 1330. Grant line 1331 may be connected to 6LOWPAN circuitry 1310 and BLE circuitry 1320. Grant signals may be provided on grant line 1331 to indicate which communications circuit is granted access to the RF medium. Grant signals may be provided by a master circuit, which is illustrated as Wi-Fi circuitry 1330. Each of circuitries 1310, 1320, and 1330 may require access to the same RF medium when communicating data.

The RFA lines 1311 and 1321 may be shared among both 6LOWPAN circuitry 1310 and BLE circuitry 1320 so that the circuits are aware of when each makes a request for access. Such information sharing can assist in avoiding collision events. The RFA may be provided to Wi-Fi circuitry 1330, which decides whether to grant access. The priority lines may specify that a particular circuit is given priority over the other circuit and that its request to access the RF medium is of high priority and the other communication circuits should yield where possible. For example, 6LoWPAN circuitry 1310 may have priority over BLE circuitry 1320 during an alarm event. In the event of potential collisions for RF medium access, master or host circuitry can control which circuitry is granted access. The master or host circuitry can be a processor other than one of the communications circuits (e.g., system processor 402) or it can be implemented by an onboard processor of one of the communication circuits (e.g., Wi-Fi circuitry 1330).

Priority may be conveyed using one of two different approaches. One approach uses direct notification. In this approach, the host (e.g., Wi-Fi 1330) can issue grant command to the communications circuits to inform them which has priority. The grant command may not necessarily be a single Boolean value, but can include an enumeration or bit field indicating which circuit has priority or is allowed to assert its priority line. In another approach, implicit notification may be used. In implicit notification, a circuit may impliedly have priority if its priority input pin is not asserted. If its priority input pin is asserted, then it may not have priority.

The 6LoWPAN communication circuitry priority cases are shown and described in Table 1.

TABLE 1

| | |
|---|---|
| No Priority, Yield to BLE Circuitry | 6LO_Priority not asserted, yield to BLE when Grant asserted but BLE_RFA also asserted |
| Priority | 6LO_Priority asserted, do not yield BLE_RFA asserted |
| No Priority, Retain access against BLE Circuitry | 6LO_Priority not asserted, do not yield to BLE when Grant asserted but BLE_RFA also asserted |

The BLE communications circuitry priority cases are shown and described in Table 2.

TABLE 2

| | |
|---|---|
| No Priority | BLE_Priority not asserted, yield to 6LoWPAN when Grant asserted but 6LO_RFA also asserted |
| Priority | BLE_Priority asserted, do not yield to 6LO_RFA asserted |

Figure 14A:
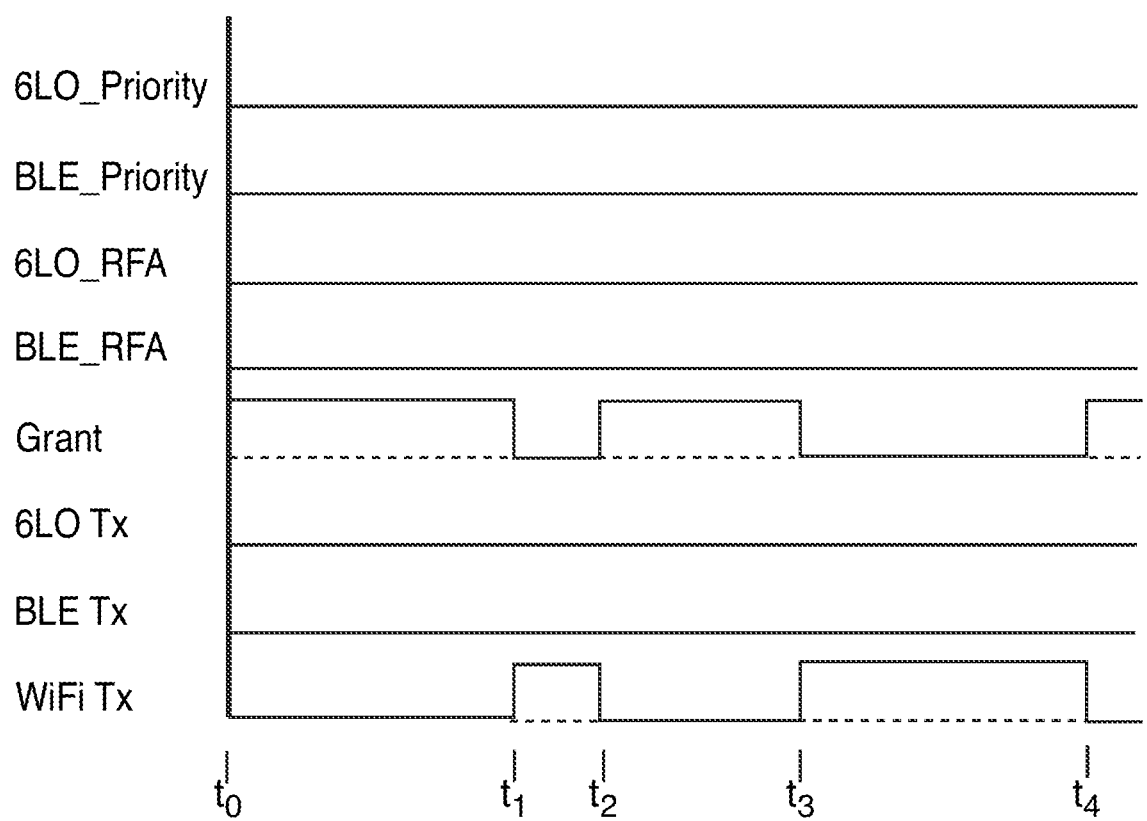
FIGS. 14A-14B show priority cases for Wi-Fi circuitry, according to some embodiments.

The priority cases for Wi-Fi circuitry 1330 are described in connection with FIGS. 14A-14B. FIG. 14A shows an illustrative base case in which both priority lines for 6LOWPAN circuitry 1310 and BLE circuitry 1320 are LOW, indicating that the these circuits are not requesting priority. In addition, there are no pulses in 6LO_RFA nor BLE_RFA, indicating that 6LoWPAN 1310 and BLE circuitry 1320 are not requesting access. From time t0 to t1, the Grant line is HIGH, implying that Wi-Fi circuitry 1330 is granting access to the RF medium. From time, t1 to time, t2, Grant is LOW and WiFi Tx is HIGH. Thus, Wi-Fi circuitry 1330 denies grant when it wishes to transmit. This is also shown between time, t3 and t4. Moreover, during the base case, 6LoWPAN circuitry 1310 and BLE circuitry 1320 may be permitted to access the RF medium when Grant is HIGH.

Figure 14B:
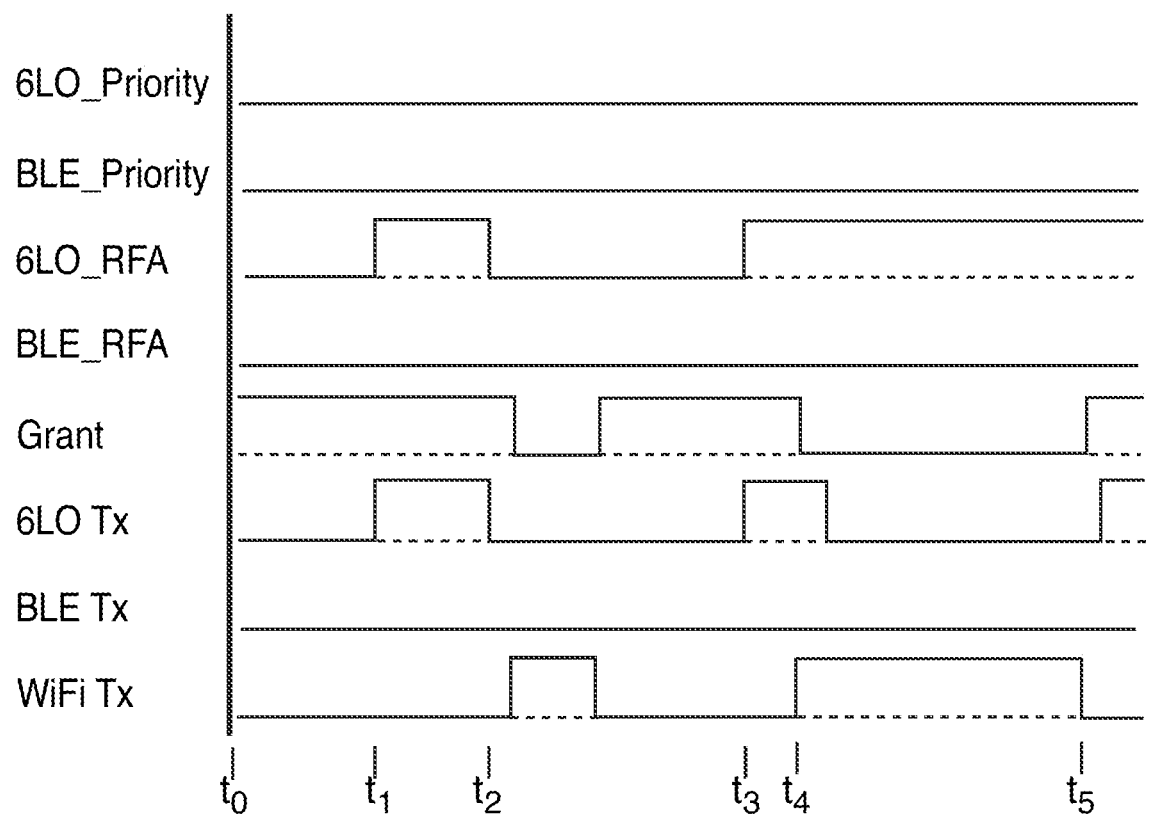

FIG. 14B shows an illustrative case showing grant and denial of 6LoWPAN circuitry 1310 access to the RF medium based status of Grant, according to an embodiment. As shown, between times t1 and t2, 6LO_RFA is HIGH while Grant is HIGH, thereby enabling 6Lo Tx to go HIGH. Starting at time, t3, 6Lo Tx is initially HIGH, but this transmission is denied at time, t4, when Grant is set LOW and WiFi Tx goes HIGH. Then, at time t5, Grant returns to HIGH, thereby enabling 6LoWPAN circuitry to continue transmitting.

Figure 15A:
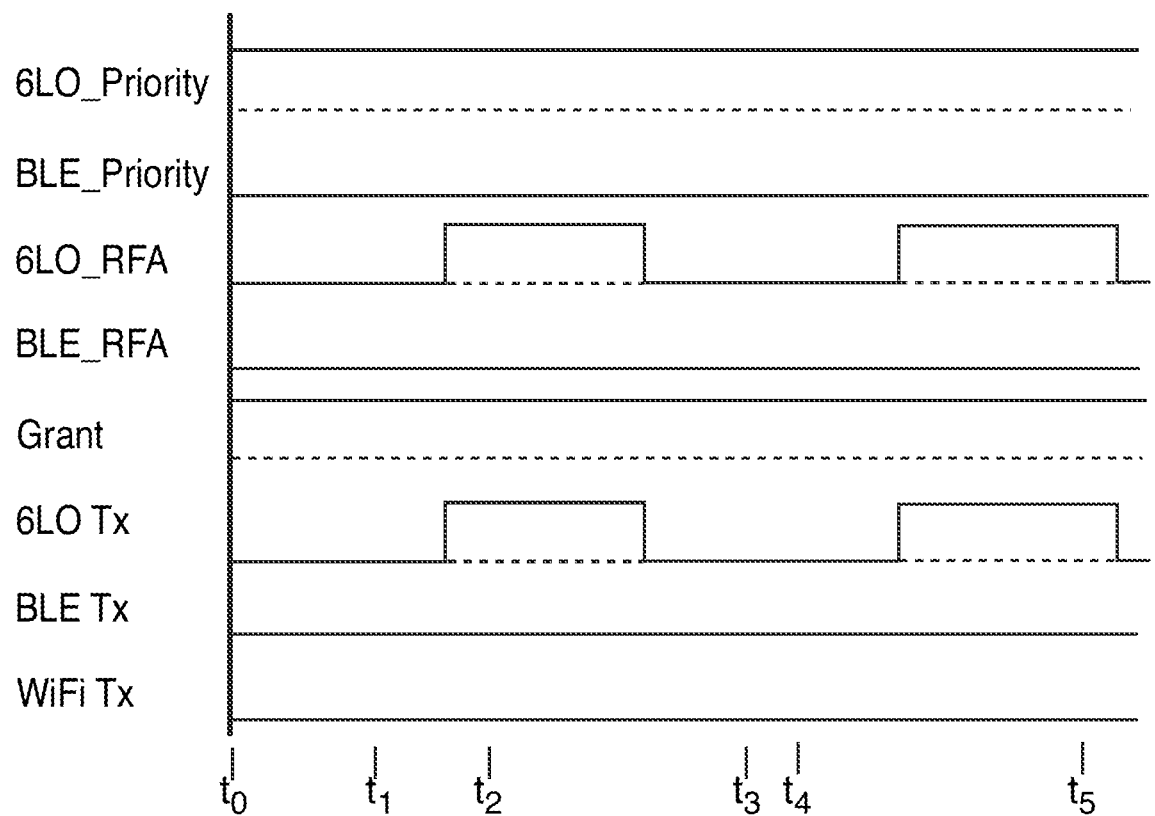
FIGS. 15A-D shows different illustrative 6LoWPAN priority use cases, according to various embodiments.
Figure 15B:
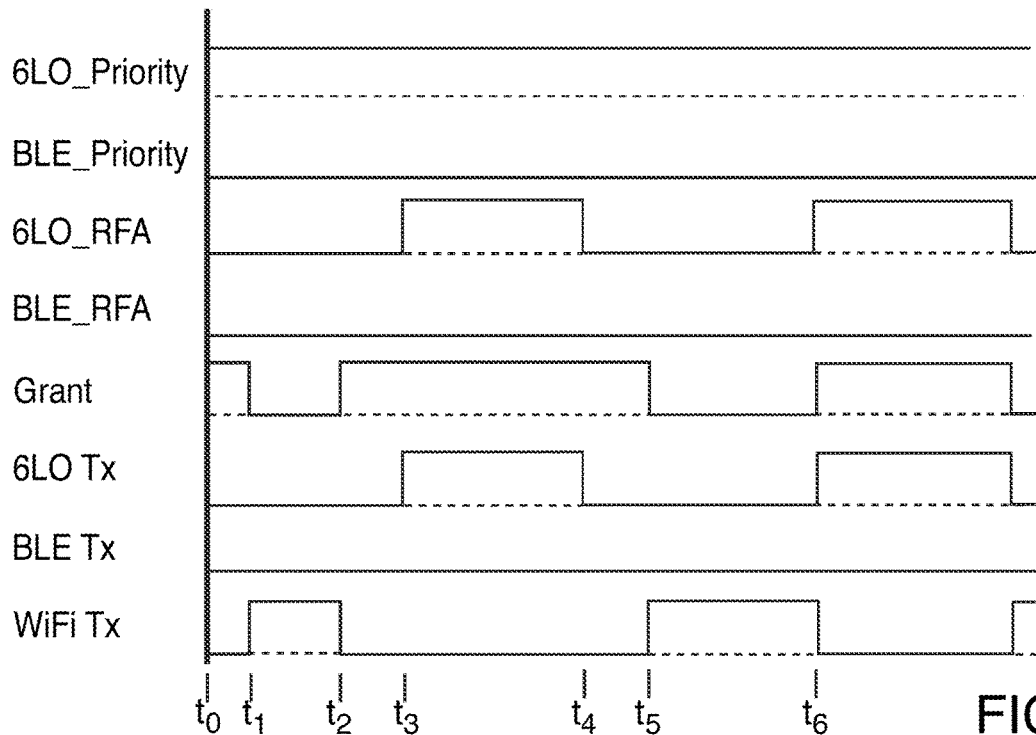
Figure 15C:
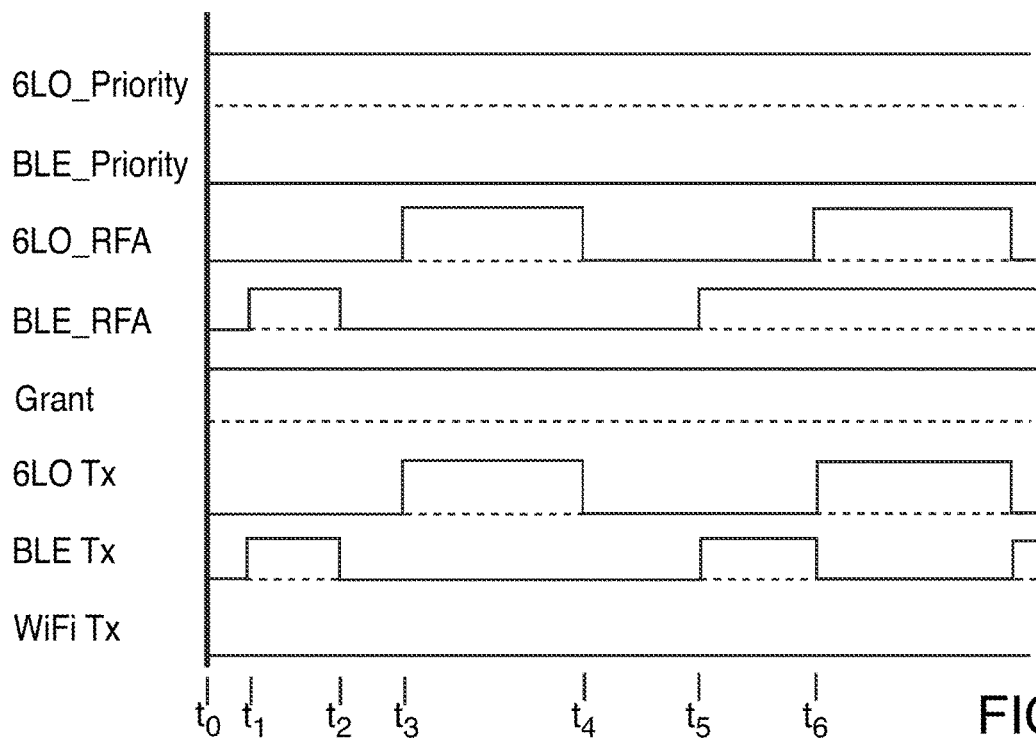
Figure 15D:
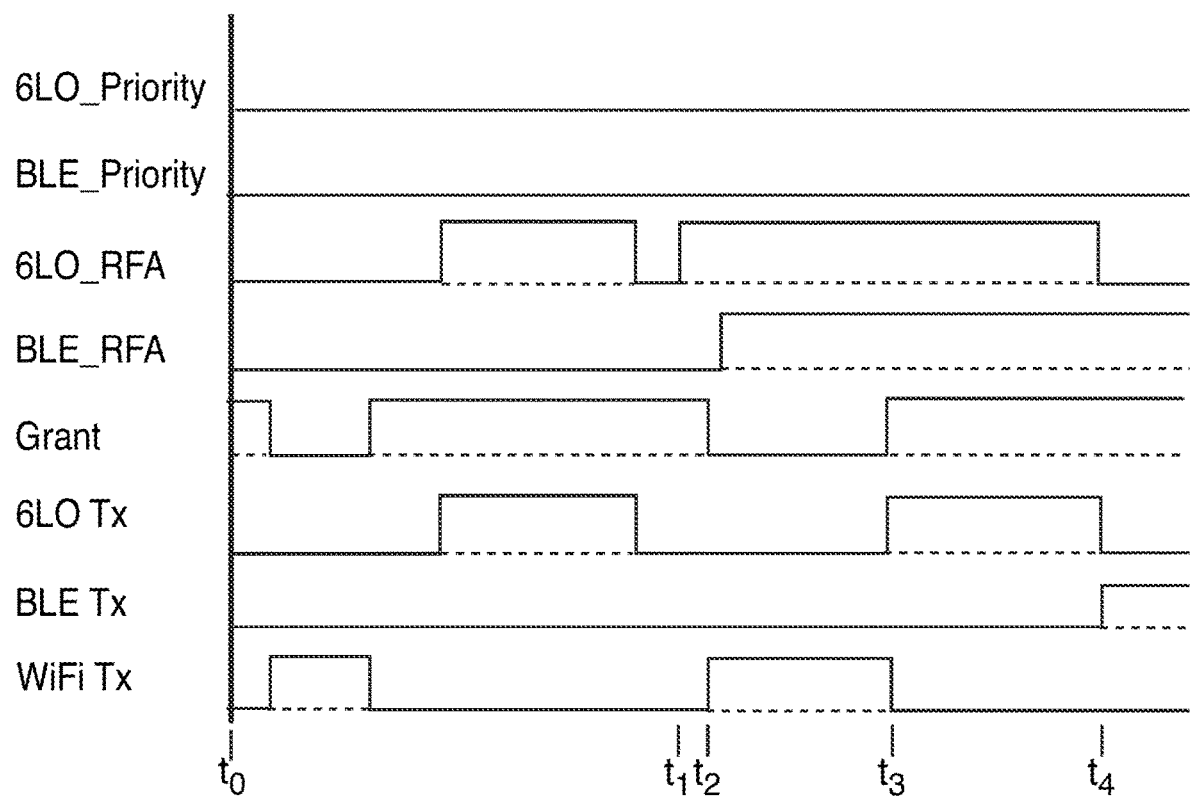

FIGS. 15A-D shows different illustrative 6LoWPAN priority use case, according to various embodiments. In particular, FIG. 15A shows an illustrative base case and FIGS. 15B-15D show priority, no priority, and Retain access against BLE priority use cases, respectively, of Table 1. As shown in the base case of FIG. 15A, 6LoWPAN circuitry 1310 requests access twice and is granted access both times. In addition, there are no collisions and 6LO_Priority and Grant are HIGH throughout.

FIG. 15B shows an illustrative priority use case for 6LoWPAN in which 6LO_Priority is HIGH throughout. From times t1-t2, there are not request for access by either 6LO or BLE, thereby enabling Wi-Fi to revoke its Grant and transmit. At time t3, 6LO_RFA goes HIGH and 6LO Tx transmits from time t3 to t4. At time t5, Wi-Fi Tx goes HIGH. However, at time t6, 6LO_RFA goes HIGH, and because 6LO has priority, Wi-FI Tx goes LOW and 6LO is permitted to transmit.

Referring now to FIG. 15C, 6LO_Priority and Grant are HIGH throughout. At times t1-t2, BLE_RFA is HIGH, and because 6LO_RFA is LOW, there is no conflict, and BLE Tx is permitted to go HIGH. At times t3-t4, 6LO_RFA is HIGH, and is granted access, resulting in 6LO Tx going HIGH. Starting at time t5, BLE_RFA is HIGH, and BLE Tx begins to transmit until time, t6, at which point 6LO_RFA goes HIGH. Now, at time t6, there is a conflict between 6LO_RFA and BLE_RFA, but because 6LO_Prioirty is HIGH, 6LO Tx goes HIGH, indicating that 6LoWPAN circuitry 1310 decides to transmit despite the assertion by BLE circuitry 1320.

Referring now to FIG. 15D, both 6LO_Priority and BLE Priority are LOW but circuitry 1300 is configured to permit grant 6LoWPAN circuitry 1310 access in case of a collision. Starting at time t1, 6LO_RFA goes HIGH and at time t2, BLE_RFA goes HIGH, but Grant goes LOW to allow Wi-Fi circuitry to transmit until time t3. At time t3, Grant goes HIGH, at which time, 6LO Tx begins transmitting (as shown). BLE Tx does not transmit because BLE circuitry 1320 does not have priority and knows that 6LO_RFA has already been asserted. BLE Tx may go HIGH as it detects the falling edge of 6LO Tx at time t4.

The priority use cases for BLE circuitry 1320 are similar to the priority use cases of 6LoWPAN circuitry 1310. For example, if FIGS. 15A-15C were used to illustrate the priority use cases of BLE circuitry 1320, the 6LO priority, RFA, and Tx labels can be transposed with the BLE priority, RFA, and Tx labels.

Figure 16A:
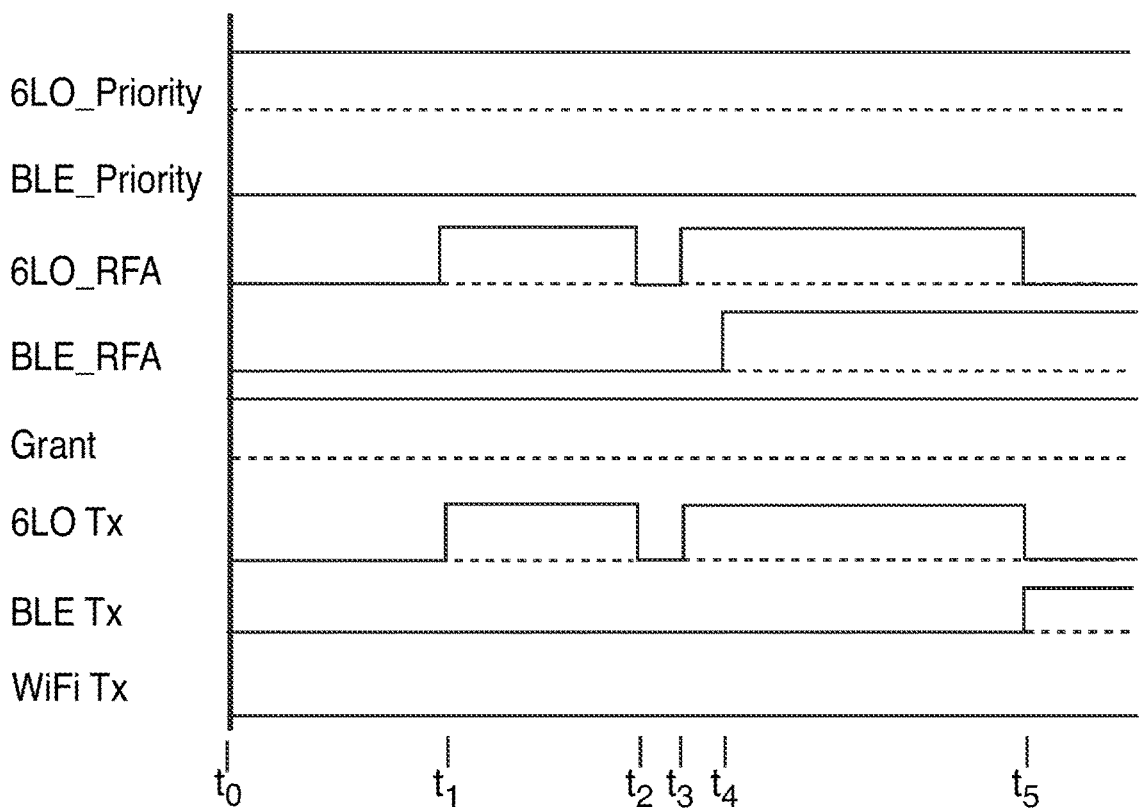
FIGS. 16A and 16B show illustrative timing diagrams where Wi-Fi circuitry is OFF, according to various embodiments.
Figure 16B:
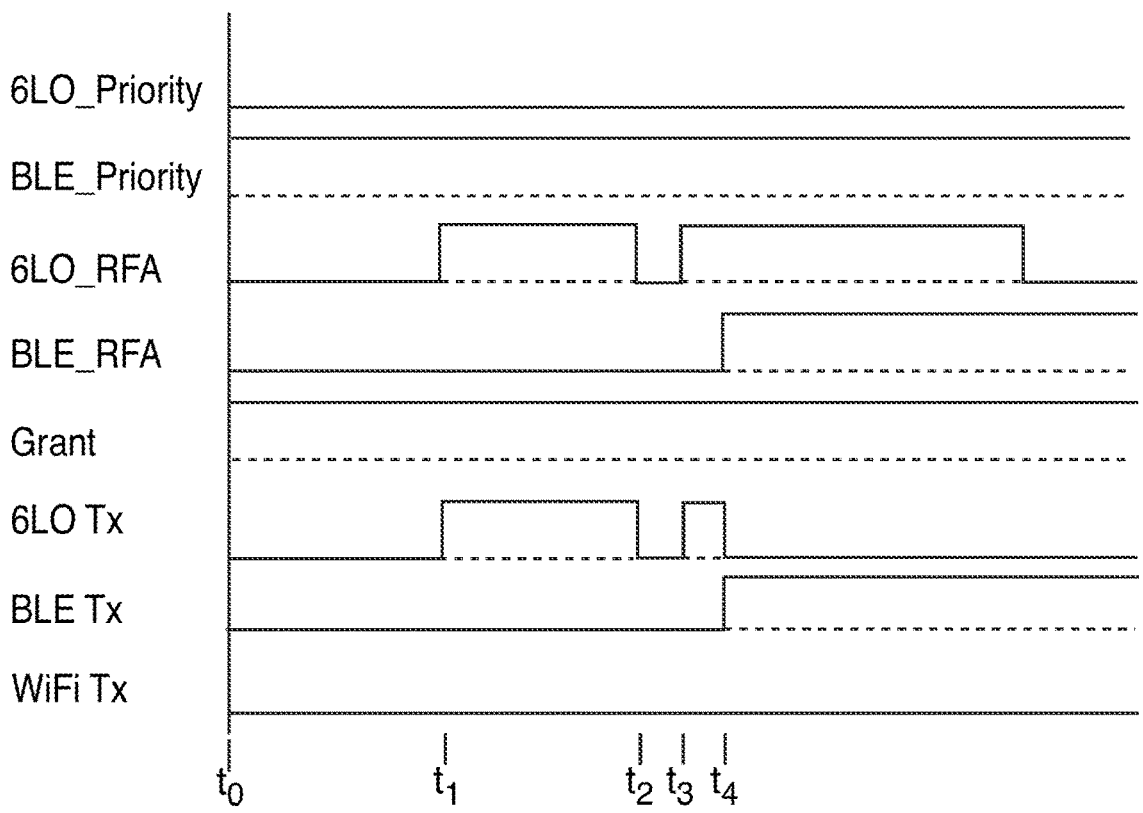

FIGS. 16A and 16B show illustrative timing diagrams where Wi-Fi circuitry 1330 is OFF, according to various embodiments. When Wi-Fi circuitry 1330 is OFF, 6LoWPAN circuitry 1310 and BLE circuitry 1320 are operative to arbitrate among themselves to determine who has access to the RF medium. 6LoWPAN circuitry 1310 and BLE circuitry 1320 may arbitrate among themselves based on their priority line assertions and the state of the other circuit's RFA signal. FIG. 16A illustrates timing diagrams where Wi-Fi is OFF and 6LoWPAN circuitry has priority, according to an embodiment. As shown, 6LO_Priority and Grant are HIGH. At time t1, 6LO_RFA goes HIGH and then goes LOW at time t2. 6LO Tx is HIGH from times t1 to t2. At time t3, 6LO_RFA goes HIGH, during which time, 6LO Tx is also HIGH. BLE_RFA goes HIGH at time t4 and remains HIGH. BLE Tx continues to yield to 6LO Tx until time t5, at which point 6LO_RFA goes LOW. 6LO Tx may not yield between times t4 and t5, despite the pulse on BLE_RFA, because 6LoWPAN circuitry 1310 has priority.

FIG. 16B illustrates timing diagrams where Wi-Fi is OFF and BLE circuitry has priority, according to an embodiment. As shown, Grant and BLE Priority are HIGH. At times t1 to t2, 6LO Tx is permitted access to transmit since there is no collision. At time t3, 6LO_RFA goes HIGH, and 6LO Tx begins transmitting. At time t4, however, BLE_RFA goes HIGH. Since BLE circuitry has priority, BLE Tx takes priority over 6LO Tx. As a result, BLE Tx goes HIGH and 6LO Tx goes LOW.

Figure 17:
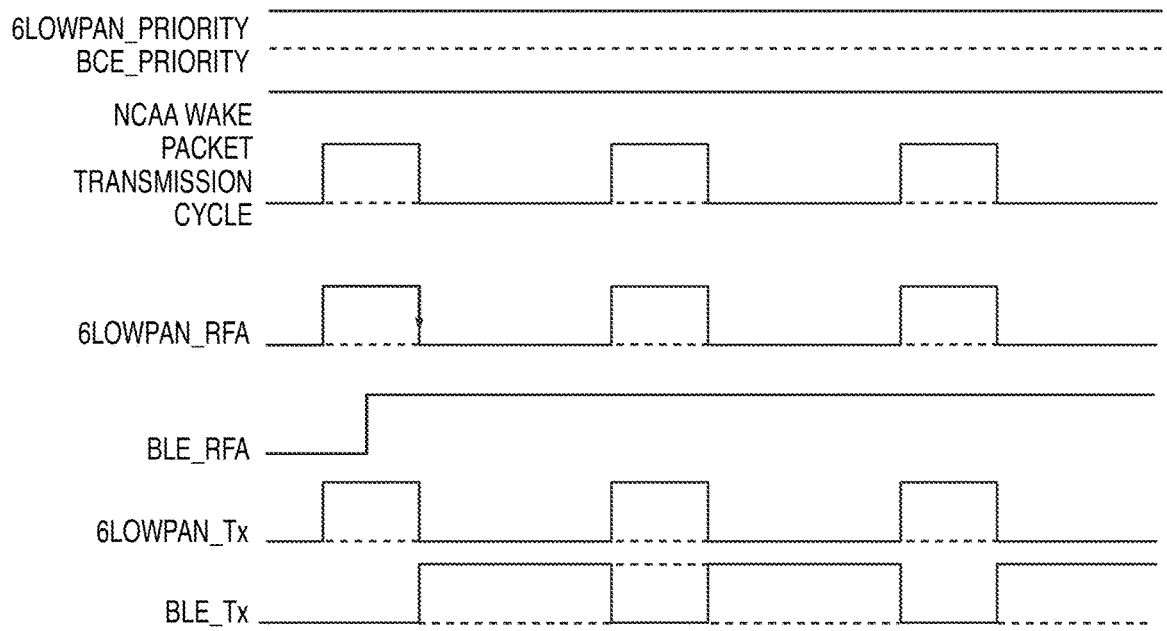
FIG. 17 shows an illustrative timing diagram showing how the BLE circuitry attempts to communicate with a personal device during the idle portion of a wake packet being transmitted by 6LoWPAN circuitry during a NCCA period, according to an embodiment.

Referring now to FIG. 17, an illustrative timing diagram showing how the BLE circuitry attempts to communicate with a personal device during the idle portion of a wake packet being transmitted by 6LoWPAN circuitry during a NCCA period, according to an embodiment. During the NCAA period, Wi-Fi circuitry 1330 is not yet turned ON, therefore 6LoWPAN circuitry 1310 and BLE circuitry 1320 may arbitrate amongst themselves to determine who has access to the RF medium. For purposes of this timing diagram, assume that the 6LoWPAN has priority (e.g., because hazard detection system has raised its alarm). FIG. 17 shows that the NCCA wake packet transmission cycle has a period including an active portion (as evidenced by the HIGH pulse) and an idle portion (as evidenced by the LOW signal). The 6LoWPAN_RFA may track the active portion of each wake packet. Since 6LoWPAN circuitry 1310 has priority, it controls access to the RF medium regardless of any RFA by BLE circuitry 620. This is shown in the FIG., as evidenced by 6LoWPAN Tx going HIGH in concert with the 6LoWPAN pulses. BLE_RFA is shown to remain HIGH throughout the timing diagram, thus indicating BLE circuitry 1320's desire to attempt communications with a personal device (not shown). BLE circuitry 1320 is permitted to communicate during the idle portion of each wake packet transmission. This is shown where BLE Tx goes HIGH when 6LoWPAN Tx goes LOW, and vice versa.

During the BLE Tx HIGH signal period, BLE circuitry 1320 attempts to communicate with one or more personal devices. BLE circuitry 1320 may do this by 1) advertising its presence to the personal device (e.g., on channel 37 of a BLE protocol), 2) authenticating the personal device (e.g., on channel 38 of the BLE protocol), and 3) commencing data transfer with the personal device (e.g., on channel 39 of the BLE protocol). BLE circuitry 1320 may perform all three steps during a single BLE Tx session or over a series of BLE Tx sessions. The data transfer can specify instructions for altering the state of the system. For example, if the system is alarming, the instruction can contain a hush instruction that commands the system to change from an alarming state to a hush state.

Figure 18:
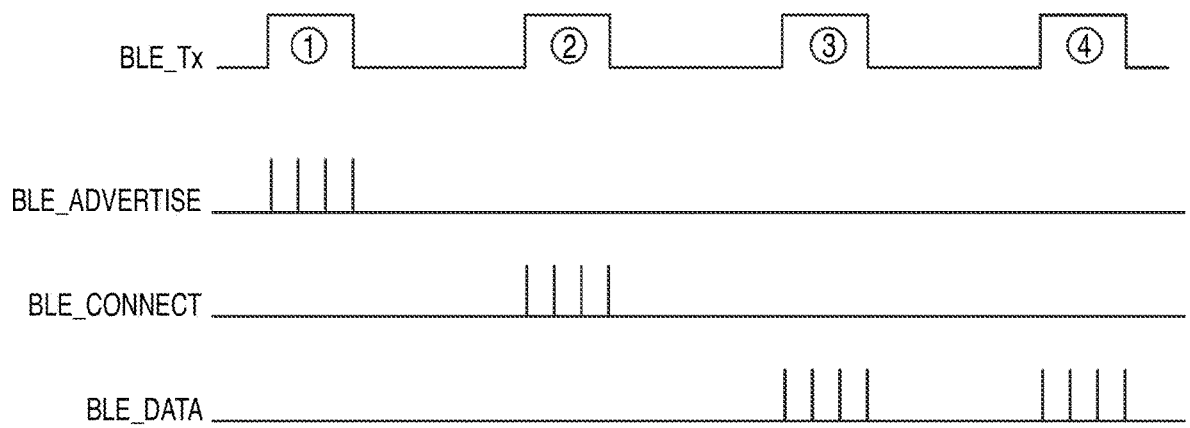
FIG. 18 shows illustrative timing diagrams of exemplary BLE advertise, connect, and data transfer activity during BLE transmissions, according to an embodiment.

FIG. 18 shows illustrative timing diagrams of exemplary BLE advertise, connect, and data transfer activity during BLE transmissions, according to an embodiment. The BLE operations of advertise, connect, and data transfer may occur during BLE_Tx activity, which occur when BLE Tx is HIGH. As shown in FIG. 18, the BLE operations are performed in one of the four BLE_Tx activity windows. BLE Advertise may occur during BLE_Tx activity window 1, and BLE connect may occur during BLE_Tx activity window 2. After a connection is made, BLE data may be transmitted between a personal device and the system during windows 3 and 4.

Figure 19:
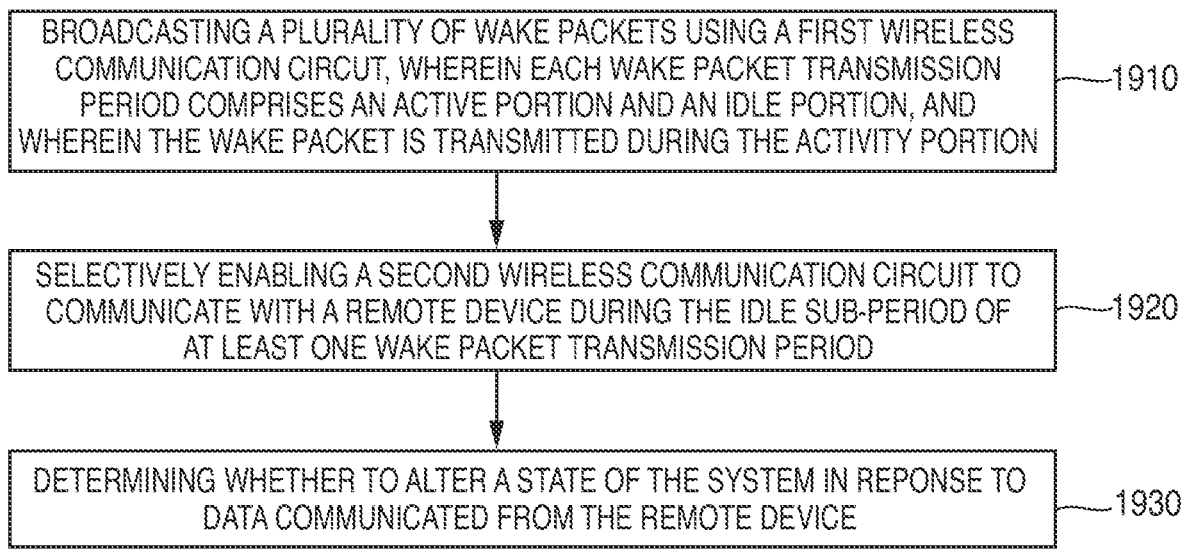
FIG. 19 shows an illustrative process for enabling rapid response to instructions generated by a personal device (or out of fabric network device) while a hazard detection system is engage in a fabric network wakeup event, according to an embodiment

FIG. 19 shows an illustrative process 1900 for enabling rapid response to instructions generated by a personal device (or out of fabric network device) while a hazard detection system is engage in a fabric network wakeup event, according to an embodiment. During the fabric network wakeup event, one or more communications circuits may not yet be operational to conduct wireless communications. As such, these inactive communications circuits cannot communicate with the personal device until the system wakes up and those circuits are activated. Thus, in the interim, a communications circuit that is active and capable of wireless communications may be used to communicate with the personal device. This communications circuit may have to compete with access to the same RF medium being used by another communication circuit that is actively engaged in communications with other systems in the fabric network. Process 1900 can manage the coexistence of signals that require access to the same RF medium in order to enable rapid interaction with a personal device.

Starting with step 1910, a plurality of wake packets can be broadcasted using a first wireless communication circuit, wherein each wake packet transmission period comprises an active portion and an idle portion, and wherein the wake packet is transmitted during the active portion. The first wireless communication circuit can be a 6LoWPAN communications circuit (e.g., circuit 1310). The first wireless communication circuit may broadcast wake packets (in both NCCA and CCA modes) for a period of time and may have priority over any other wireless communications that may compete for use of the same RF medium.

At step 1920, a second wireless communication circuit may be enabled to communicate with a personal device during the idle portion of at least one wake packet transmission period. By enabling the second circuitry to operate during the idle portion, the potential for collision is minimized. Co-existence circuitry (such as circuitry 1300) may manage the operation of the first and second communications circuits to avoid such collisions. The second wireless communications circuit can be BLE circuitry capable of conducting data transmissions with a personal device such as a cell phone that has similar circuitry. During the idle portion of one or more wake packet transmissions, the personal device can provide an instruction that is received by the second communications circuitry and acted upon by the system.

At step 1930, the system determines whether to alter a state of the system in response to data communicated from the personal device via the second communications circuitry. When the system receives an instruction from the personal device, the system may first verify whether one of its state machines will permit the instruction to be carried out. For example, if the system is alarming, and a hush alarm command is received from the personal device, the system's state machine may verify whether it is permitted to transition to a new state (e.g., a hush state) before altering state of its operation. It should be noted that in some embodiments, while the system is transmitting wake packets, the first wireless circuitry and second wireless circuitry may be the only circuits capable of wireless communications, and that a third wireless communications circuitry is not yet able to conduct wireless communications. Thus, the ability to receive and process instructions that can alter the state of the system before it is able to activate cloud network communications circuitry can improve the user experience in quickly interacting with the system.

The discussion now refers to embodiments for processing gestures to alter the state of a system. The gestures may be made using a personal device that is located remote and the instructions being transmitted from the personal device to the system may use one of the communications networks discussed above. For example, gesture based instructions may be communicated to the system via the close proximity communications network, via the cloud based communications network, or via the fabric network. The particular network used may depend on various factors such as, for example, whether the personal device includes the appropriate circuitry for communicating over a particular network and the operational state of the system.

Figure 20A:
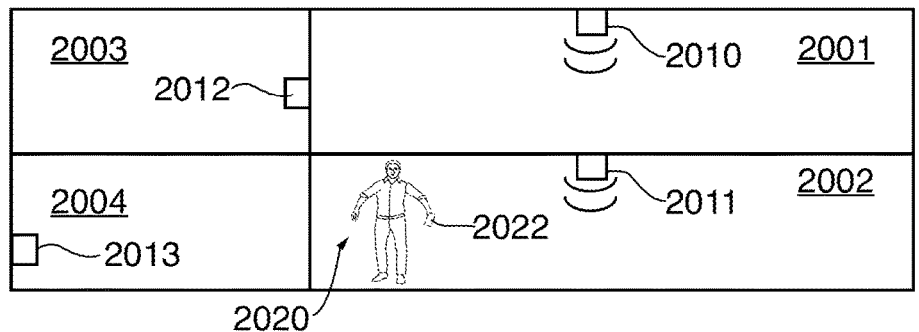
FIGS. 20A-20C show several illustrative screen shots that illustrate how a user can interact with his or her personal device to alter a state of a device that can receive remotely generated instructions, according to an embodiment.
Figure 20B:
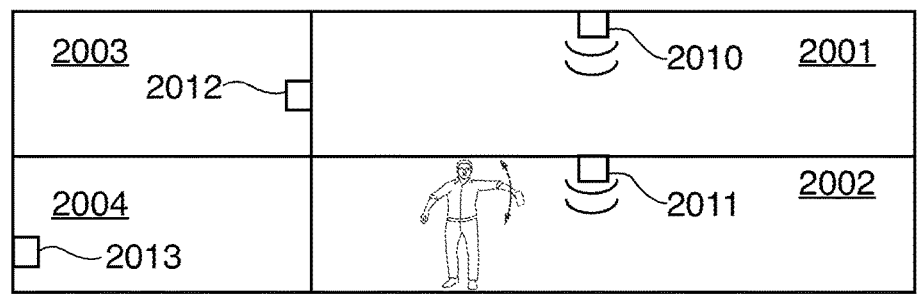
Figure 20C:
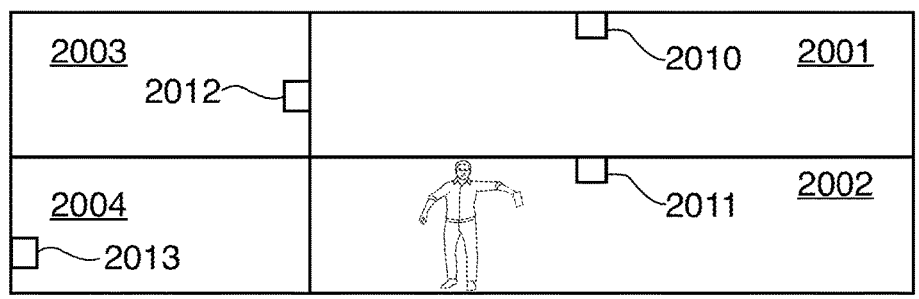

FIGS. 20A-20C show several illustrative screen shots that illustrate how a user can interact with his or her personal device to alter a state of a device that can receive remotely generated instructions, according to an embodiment. Each of FIGS. 20A-20C show structure 2000 with rooms or regions 2001-2004 of the structure. One more or devices may exist in each room. For example, as shown, hazard detection systems 2010 and 2011 may exist in rooms 2001 and 2002, respectively, light system 2012 may exist in region 2003, and doorbell system 2013 may exist in region 2004. Hazard detection systems 2010 and 2011, for example, may be similar to detection systems 200, 300, or 400. Systems 2010 and 2011, light system 2012, and doorbell system 2013 may all be network connected devices that can communicate with each other, a wireless router (not shown), and personal device 2022 being used by person 2020. In some embodiments, personal device can be an out-of-fabric network device. Personal device 2022 can be, for example, a device a user can carry in a pocket or purse, or wear. User 2020 can interact with device 2022 to control and/or alter a state of operation of any one of systems 2010-2013. There may be instances when device 2022 is not permitted to control the operation of one of systems 2010-2013 even though wireless communications are possible. Location based restrictions may be enforced to comply with regulatory requirements. For example, regulations may require that a user be located within the structure, and in some cases be within line of sight of or be in the same room as the hazard detection system he is interacting with using his personal device. Additional details of personal device 2022 can be found in FIGS. 21A-21C and 27.

Referring now specifically to FIG. 20B, hazard detection systems 2010 and 2011 may be sounding their alarms. In response to hearing the alarm, user 2020 may interact with personal device 2022. The interaction may fall into one of three general categories: a physical device movement gesture interaction, a free space gesture monitored by the physical device, or an interaction with a user interface of the device. Each of these categories is discussed in more detail below in connection with FIGS. 21A-21C.

FIG. 20B shows user 2020 interacting with device 2022 by performing any one of the three categories of interaction. In response to the user interaction, an instruction may be wirelessly transmitted (as shown by the jagged line) to each of the systems 2010-2013. Depending on various factors such as signal strength, the distance for the signals to travel, interference elements, the instruction may not be received by each system. Even if each system does receive the instruction, various additional requirements may have to be met in order for a system to act on the instruction. In some embodiments, one of the requirements may be a location requirement. Assuming, for example, that hazard detection system 2010 received the instruction and all other requirements were met, system 2011 can cease sounding its alarm in response to receiving the instruction from device 2022. System 2010 may have received the instruction, but one of the requirements may not have been met, and a result, system 2010 may not cease sounding its alarm in response to the instruction sent by device 2022. However, systems 2010 and 2011 may be able to communicate with each other independent of device 2022 using, for example, a fabric network. Using this separate communications network, system 2011 can instruct system 2010 to cease sounding its alarm. FIG. 20C shows that systems 2010 and 2011 ceased sounding their alarms.

Figure 21A:
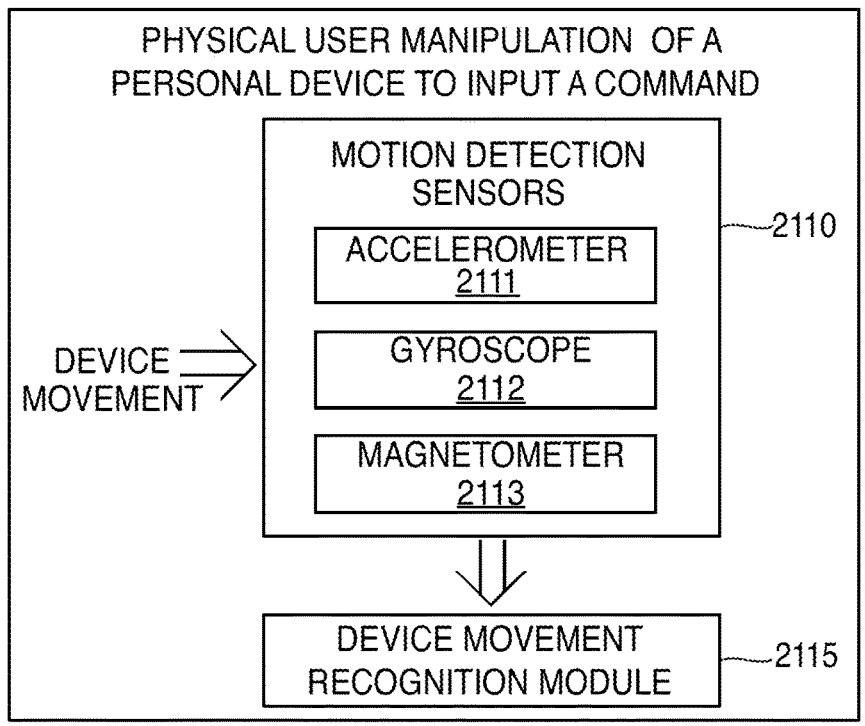
FIGS. 21A-21C shows the different categories of interactions with a personal device, according to an embodiment.
Figure 21B:
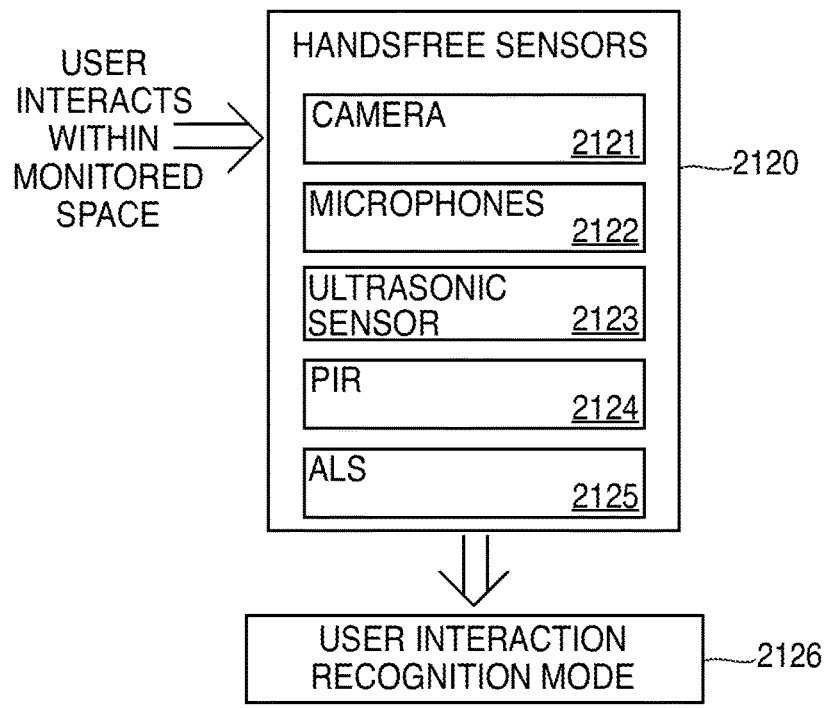
Figure 21C:
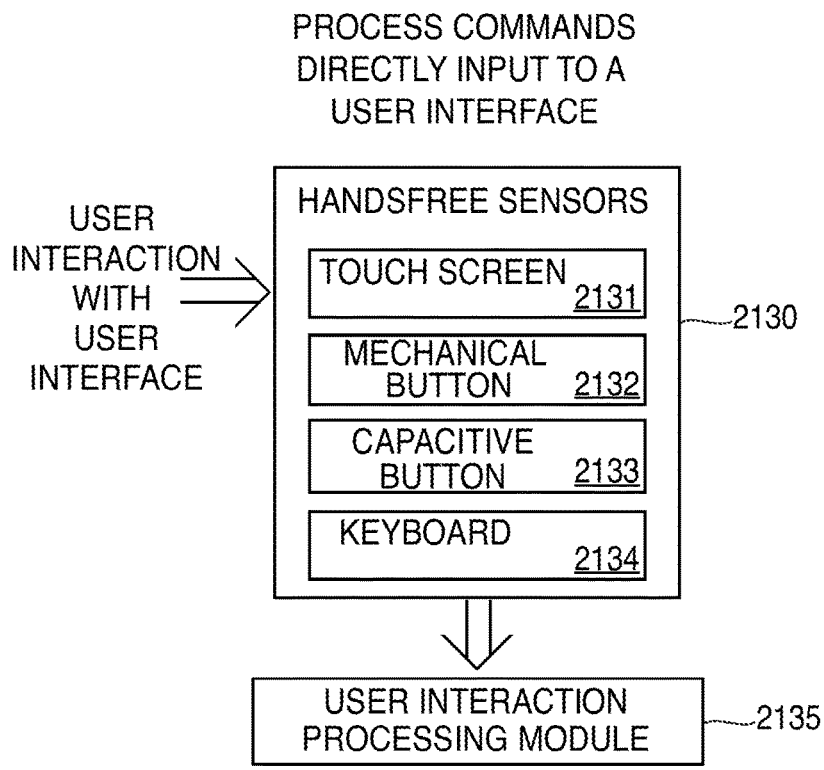
Figure 22:
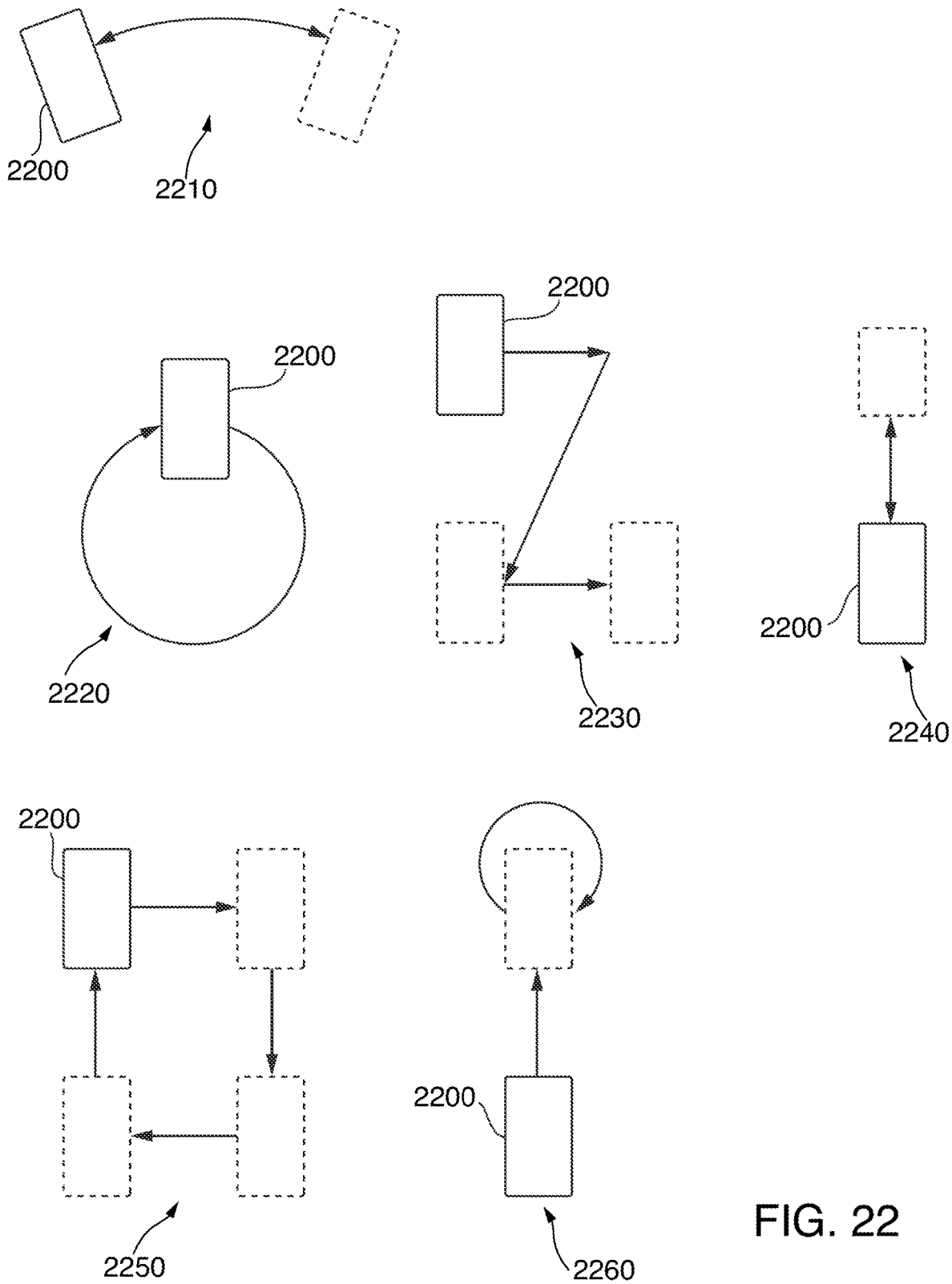
FIG. 22 shows several illustrative gestures where device is moved according to specific gestures according to various embodiments.

FIGS. 21A-21C show the different categories of interactions with a personal device, according to an embodiment. The three categories are shown as follows: a physical device movement gesture interaction (FIG. 21A), a hands free gesture monitored by the physical device (FIG. 21B), or an interaction with a user interface of the device (FIG. 21C). Each category shows illustrative sensors that may be used by the device to detect gesture interactions and a software module that may be used to process data obtained from those sensors. As defined herein, a gesture is a specific movement of at least a portion of a person's body in free space. For example, a person waving his arm may be considered a gesture. Other examples of gestures can include movement of an arm or finger in specific patterns or moving two arms together or apart. Thus, gestures performed according to one of the categories may embody the characteristics defining that category. For example, a gesture performed according to the physical device movement category can involve moving the personal device in accordance with a specific gesture. This may be akin to a person treating the personal device as an extension of his hand, as a wand being held by the hand, or a wearable that is attached to a wrist. For example, FIG. 22 shows several illustrative gestures where device 2200 is moved according to specific gestures. Gesture 710 shows device 700 being moved in a wave like motion. Gesture 2220 shows device 2200 being moved in a circular motion. Gesture 2230 shows device 2200 being moved in a zig-zag motion. Gesture 2240 shows device 2200 being moved in a thrusting motion. Gesture 2250 shows device 2200 being moved in a square-like motion. Gesture 2260 shows device 2200 being thrust forward and then turned.

Referring back to FIG. 21A, physical device movement gestures may rely on motion detection sensors 2110. Examples of motion sensors can include accelerometer 2111, gyroscope 2112, and magnetometer 2113. Device movements may be detected by motion detection sensors 2110 and provided to device movement recognition module 2115. Module 2115 may process data provided by motion detection sensors 2110 and determine which gestures are performed.

Figure 23:
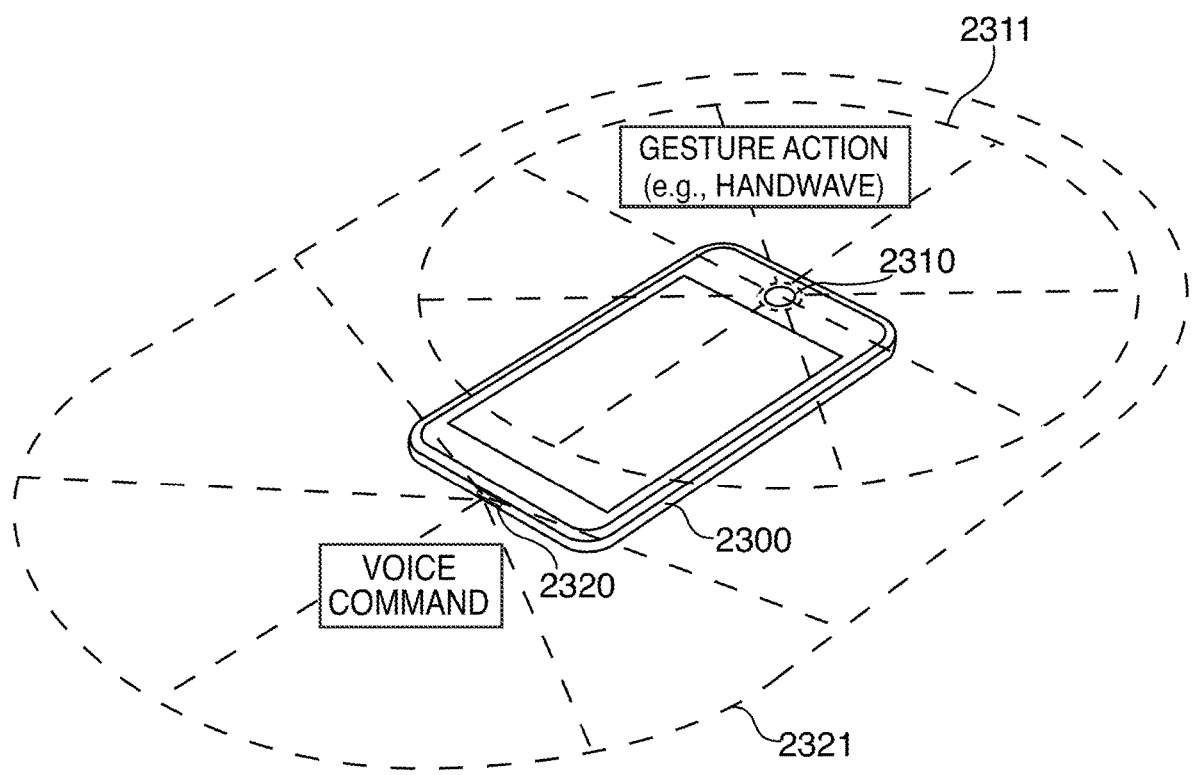
FIG. 23 shows an illustrative device that has a camera and microphone, according to an embodiment.

Gestures performed according to the hands free category can involve user interactions within a monitorable vicinity of the personal device. In this category, the user does not touch or hold the personal device, but performs a hands free gesture in the vicinity of the device. For example, the device may be lying on a table or mounted on a wall and a user performs a gesture in the presence of the device's sensors. FIG. 23 shows an illustrative device 2300 that has camera 2310 and microphone 2320. Camera 2310 may be able to detect gesture actions within its field of view, shown as 2311, and microphone may be able to detect audio inputs (e.g., voice commands) within its audio pickup range, shown as 2321.

Referring back to FIG. 21B, hands free gestures and other non-device moving inputs may be monitored by one or more device sensors 2120. Examples of such device sensor can include camera 2121, microphone 2122, ultrasonic sensor 2123, passive infrared sensor (PIR) 2124, and ambient light sensor (ALS) 2125. Free space interactions may be monitored by one or more of sensors 2120 and data may be provided to free space gesture recognition module 2126. Module 2126 may process data provided by sensors 2120 and determine whether a free space gesture or other non-device movement gesture has been detected.

Figure 24:
FIG. 24 shows an illustrative touch screen user interface on a device, according to an embodiment.
Figure 25:
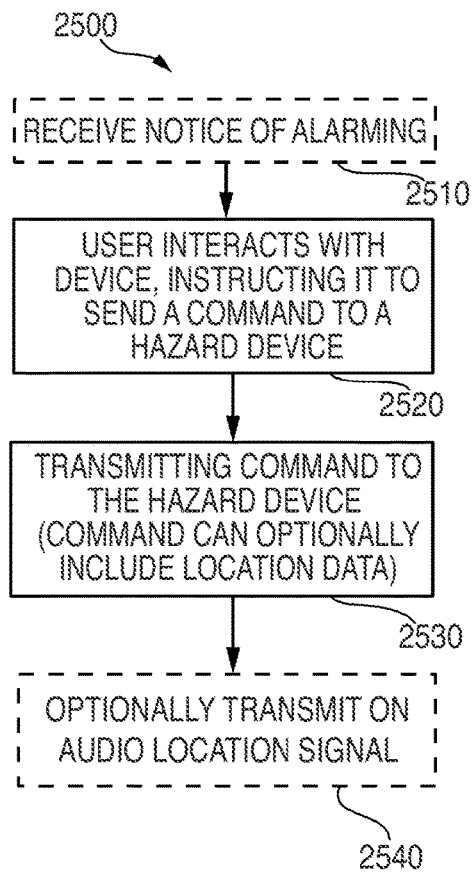
FIG. 25 shows an illustrative flowchart of a process that may be practiced by a personal device according to an embodiment.

Gestures performed according to the user interface category can involve user interactions within user interface 2130 located on the device. Such user interfaces are native to the device and may be tactile. Examples of user interfaces include a touch screen 2131, mechanical button 2132, capacitive button 2133, or keyboard 2134. User interface inputs are receive via one of user interfaces 2130 and provided to user interface processing module 2135. User interface processing module 2135 may process the data provided by the user interface and instruct a processor or other circuitry to take an appropriate action. FIG. 24, for example, shows an illustrative touch screen user interface 2410 on device 2400. A user may press a touch screen button 2411 to send a wireless instruction to a hazard detection system FIG. 25 shows an illustrative flowchart of process 2500 that may be practiced by a personal device according to an embodiment. The personal device may any device suitable for processing gestures according to any one of the three categories of gestures. Beginning with optional step 2510, a device may receive a notice from a hazard detection device. For example, the notice may be an alarm notice. At step 2520, the device may monitor for a gesture interaction by a user. The gesture interaction may specify a command to alter a state of the hazard detection system. The device may determine whether a gesture interaction is recognized, as indicated by step 2530. For example, the device may leverage motion detection sensors 2110 or sensors 2120, and corresponding modules 2115 and 2126 to determine whether a gesture is recognized.

At step 2540, an instruction can be transmitted to the hazard detection device in response to determining that a gesture interaction is recognized. The instruction can include a command to alter a state of the hazard detection system. For example, the instruction can include a silence alarm command. The instruction can include other data that may be used by hazard detection system. This other data may include location data. Location data may include GPS data or it can include a proprietary location scheme that identifies where within a structure the device is located. The proprietary location scheme may leverage the device's ability to communicate with all the wireless devices within a structure, thereby enabling the device to triangulate its position within the structure. The device may update its position on a periodic basis.

The location information may be used by the system receiving the instruction to verify that the device is in a location that satisfies certain requirements before it executes any commands that are associated with the instruction. For example, Underwriter Laboratory may require confirmation that that a user is in the line of sight or within the same room as the hazard detection system before the system takes action in response to an instruction generated by a remote device. As an optional addition to any location information that may be transmitted to the hazard detection system, or an alternative thereto, the device may transmit an audio location signal, as indicated by step 2550.

The audio location signal may be a high frequency audio signal that is emitted by a device. The frequency of the audio signal may be above or below the frequency range that can be heard by humans and/or canines. An advantage of using an audio frequency signal for specifying location may be that audio signals do not carry through walls and other elements of a structure as easily as wireless signals. Thus, audio signals, at least compared to wireless signals, may provide a more accurate location determination. In some applications, use of audio signals may be used to confirm that the device transmitting the instruction is within line of sight location of the hazard detection system.

It is understood that the steps shown and discussed in connection with FIG. 25 are merely illustrative and that additional steps may be added, steps may be omitted, and steps may be arranged in a different order. For example, the hazard detection system may be replaced with a non-hazard detection system such as a thermostat, doorbell system, or a light system. Such non-hazard systems may not require verification of the device's location. Accordingly, the device may not have to provide any location information or emit an audio signal when providing an instruction to such systems.

Figure 26:
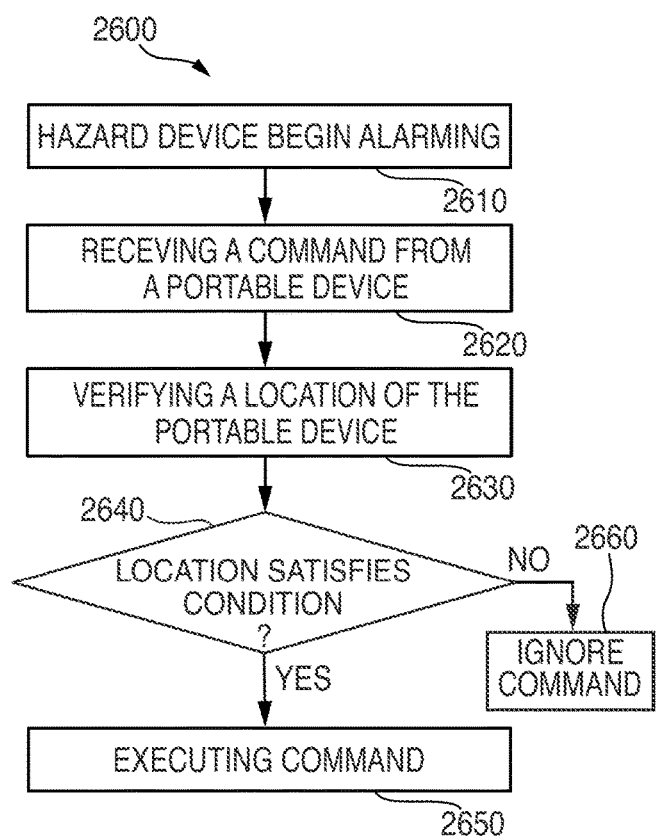
FIG. 26 shows an illustrative flowchart of a process that may be practiced by a hazard detection device according to an embodiment.

FIG. 26 shows an illustrative flowchart of process 2600 that may be practiced by a hazard detection device according to an embodiment. Starting with step 2610, a hazard detection system may begin alarming. This step is merely illustrative as the hazard detection system may be pre-alarming or be operating in another state. At step 2620, an instruction may be received from a personal device. The instruction can be generated in response to a user gesture that falls within any one of the three categories discussed above. In some embodiments, the instruction can be generated in response to physical device manipulation gestures or monitored free space gestures.

At step 2630, a location of the personal device can be determined. The location of the personal device can be determined using any one of a number of suitable techniques. In one embodiment, the system can evaluate location data included with the received instruction. For example, the location data can be GPS data. As another example, the location data can be part of a proprietary location data system such as the proprietary system discussed in connection with FIG. 25. In another embodiment, the hazard detection system can triangulate the location of the personal device. The hazard detection system may be able to communicate with other devices within a structure and coordinate a device location triangulation program. In yet another embodiment, the hazard detection may use a microphone to detect an audio location signal being emitted by the personal device.

At step 2640, the system can verify that the location satisfies at least one condition. The at least one condition can include a threshold or evaluation criteria for ensuring that the location is verified. The conditions may change based on which location metric is being used. For example, for GPS data, a range of GPS coordinates may set the meets and bounds of where the device needs to be to satisfy the condition. As another example, for audio location signals, the condition may specify a minimum amplitude threshold has to be met or exceeded in order to verify the location.

At step 2650, a state of the hazard detection system may be selectively altered, based on the received instruction, when satisfaction of the at least one condition is verified. For example, if the hazard detection system is alarming, and the instruction includes a cease alarming command, the system may change from an alarming state to a hush alarm state. At step 2660, the hazard detection may ignore or discard the instruction if the at least one condition is not verified.

Figure 27:
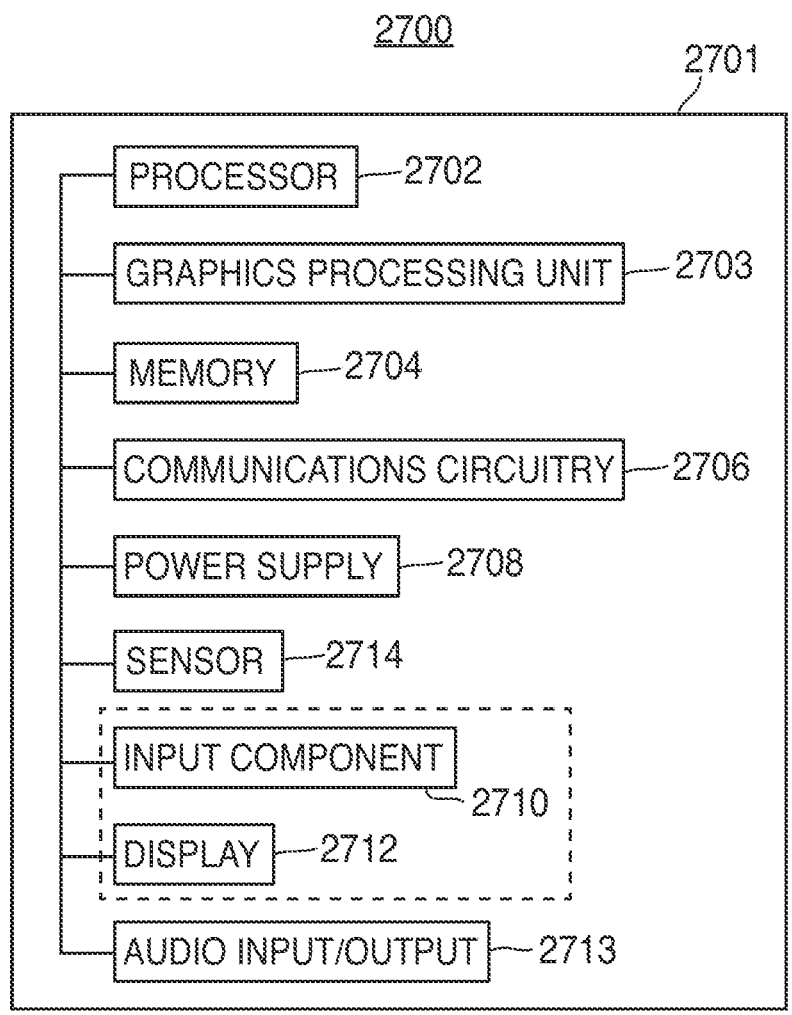
FIG. 27 shows a schematic view of an illustrative electronic device, according to an embodiment.

FIG. 27 is a schematic view of an illustrative electronic device 2700. Electronic device 2700 may be any portable, mobile, or hand-held electronic device that can operate wherever the user travels. Alternatively, electronic device 2700 may not be portable at all, but may instead be generally stationary. Electronic device 2700 can include, but is not limited to, a music player, video player, still image player, game player, virtual or augmented reality device, other media player, music recorder, movie or video camera or recorder, still camera, other media recorder, radio, medical equipment, domestic appliance, transportation vehicle instrument, musical instrument, calculator, cellular telephone, smart phone, other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 2700 may perform a single function (e.g., a device dedicated to presented product content rendered at the datacenter and for processing inputs to control aspects of the product content presented on the device) and, in other embodiments, electronic device 2700 may perform multiple functions (e.g., a device that locally renders product content for presentation, plays music, and receives and transmits telephone calls).

First electronic device 2700 may include a processor or control circuitry 2702, graphics processing unit 2703, memory 2704, communications circuitry 2706, power supply 2708, input component 2710, display 2712, audio input/output 2713, and sensor 2714. Electronic device 2700 may also include a bus 2716 that may provide one or more wired or wireless communications links or paths for transferring data and/or power to, from, or between various other components of electronic device 2700. In some embodiments, one or more components of electronic device 2700 may be combined or omitted. Moreover, first electronic device 2700 may include other components not combined or included in FIG. 27 and/or several instances of the components shown in FIG. 27. For the sake of simplicity, only one of each of the components of electronic device 2700 is shown in FIG. 27.

Memory 2704 of electronic device 2700 may include one or more storage mediums, including for example, a harddrive, flash memory, permanent memory such as read-only memory ("ROM"), semi-permanent memory such as random access memory ("RAM"), any other suitable type of storage component, or any combination thereof. Memory 2704 may include cache memory, which may be one or more different types of memory used for temporarily storing data for electronic device applications. Memory 2704 may store media data (e.g., music and image files), software (e.g., for implementing functions on electronic device 2700), firmware, preference information (e.g., media playback preferences), transaction information (e.g., information such as credit card information), wireless connection information (e.g., information that may first electronic device 2700 to establish a wireless connection), subscription information (e.g., information that keeps track of gaming services or other media a user subscribes to), contact information (e.g., telephone numbers and e-mail addresses), calendar information, any other suitable data, or any combination thereof.

Communications circuitry 2706 of electronic device 2700 may be provided to allow electronic device 27100 to communicate with one or more other electronic devices, datacenters, or servers using any suitable communications protocol. For example, communications circuitry 2706 may support Wi-Fi (e.g., an 802.11 protocol), Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multiband, etc.), any other communications protocol, or any combination thereof. Communications circuitry 2706 may also include circuitry that can enable electronic device 2700 to be electrically coupled to another device (e.g., a game controller or an accessory device) and communicate with that other device, either wirelessly or via a wired connection.

Power supply 2708 of electronic device 2700 may provide power to one or more of the components of electronic device 2700. In some embodiments, power supply 2708 can be coupled to a power grid (e.g., when device 2700 is not a portable device, such as a desktop computer). In some embodiments, power supply 2708 can include one or more batteries for providing power (e.g., when device 2700 is a portable device, such as a smartphone). As another example, power supply 2708 can be configured to generate power from a natural source (e.g., solar power using solar cells).

One or more input components 2710 of electronic device 2700 may be provided to permit a user to interact or interface with first electronic device 2700. For example, input component 2710 can take a variety of forms, including, but not limited to, a touch pad, dial, control pad, touch screen, one or more buttons (e.g., a keyboard), mouse, joy stick, track ball, microphone, camera, proximity sensor, light detector, and combinations thereof. Each input component 2710 can be configured to provide one or more dedicated control functions for making selections or issuing commands associated with operating electronic device 2700.

Electronic device 2700 may also include one or more output components that may present information (e.g., graphical, audible, and/or tactile information) to a user of first electronic device 2700. An output component of electronic device 2700 may take various forms, including, but not limited to, audio speakers, headphones, audio line-outs, visual displays, antennas, infrared ports, rumblers, vibrators, or combinations thereof.

For example, as shown in FIG. 27, electronic device 2700 may include display 2712 as an output component. Display 2712 may include any suitable type of display or interface for presenting visual data to a user. In some embodiments, display 2712 may include a display embedded in electronic device 2700 or coupled to electronic device 2700 (e.g., a removable display). Display 2712 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 2712 can include a movable display or a projecting system for providing a display of content on a surface remote from first electronic device 2700, such as, for example, a video projector, a head-up display, or a three-dimensional (e.g., holographic) display. As another example, display 2712 may include a digital or mechanical viewfinder, such as a viewfinder of the type found in compact digital cameras, reflex cameras, or any other suitable still or video camera.

In some embodiments, display 2712 may include display driver circuitry, circuitry for driving display drivers, or both. Display 2712 can be operative to display content (e.g., product content, application screens for applications implemented on first electronic device, information regarding ongoing communications operations, information regarding incoming communications requests, device operation screens, etc.) that may be under the direction of processor 2702. Display 2712 can be associated with any suitable characteristic dimensions defining the size and shape of the display. For example, the display can be rectangular or have any other polygonal shape, or alternatively can be defined by a curved or other non-polygonal shape (e.g., a circular display). Display 2712 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 2710, display 2712, audio input/output 2713 as I/O component or I/O interface 2711). For example, input component 2710 and display 2712 may sometimes be a single I/O component 2711, such as a touch screen, that may receive input information through a user's touch of a display screen and that may also provide visual information to a user via that same display screen.

Audio input/output 2713 of electronic device 2700 may include any suitable audio codec for outputting audio signals to a speaker and for receiving audio signals from a microphone. In some embodiments, audio 2713 may only output audio signals, and in other embodiments, it may only receive audio signals. A video input/output (not shown) may also be included as part of electronic device 2700 for outputting and/or receiving video signals.

Sensor 2714 of electronic device 2700 may include any suitable motion sensor operative to detect movements of first electronic device 2700. For example, sensor 2714 may be a motion-sensing component operative to detect movement of first electronic device 2700. In some embodiments, sensor 2714 may include one or more three-axis acceleration motion sensors (e.g., an accelerometer) operative to detect linear acceleration in three directions (i.e., the x- or left/right direction, the y- or up/down direction, and the z- or forward/backward direction). As another example, sensor 2714 may include one or more single-axis or two-axis acceleration motion sensors which may be operative to detect linear acceleration only along each of the x- or left/right direction and the y- or up/down direction, or along any other pair of directions. In some embodiments, sensor 2714 may include an electrostatic capacitance (e.g., capacitance-coupling) accelerometer that is based on silicon micro-machined micro electro-mechanical systems ("MEMS") technology, including a heat-based MEMS type accelerometer, a piezoelectric type accelerometer, a piezo-resistance type accelerometer, or any other suitable accelerometer.

In some embodiments, sensor 2714 may be operative to directly or indirectly detect rotation, rotational movement, angular displacement, tilt, position, orientation, motion along a non-linear (e.g., arcuate) path, or any other non-linear motions. In some embodiments, sensor 2714 may alternatively or additionally include one or more gyro-motion sensors or gyroscopes for detecting rotational movement. For example, sensor 2714 may include a rotating or vibrating element. Using sensor 2714, first electronic device 2700 can determine an orientation of display 2712, for example.

Processor 2702 of electronic device 2700 may include any processing circuitry operative to control the operations and performance of one or more components of first electronic device 2700. For example, processor 2702 may receive input signals from input component 2710 and/or drive output signals through display 2712. In some embodiments, as shown in FIG. 27, processor 2702 may be used to run software 2717. Software 2717 may include, but is not limited to, an operating system, one or more operating system applications, firmware applications, media playback applications, media editing applications, or any other suitable applications. For example, processor 2702 may load software 2717 as a user interface program to determine how instructions or data received via an input component 2710 or other component of device 2700 may manipulate the way in which information is stored and/or provided to the user via an output component (e.g., display 2712). Software 2717 may be accessed by processor 2702 from any suitable source, such as from memory 2704 (e.g., via bus 2716), or from any other suitable source. Electronic device 2700 (e.g., processor 2702, memory 2704, or any other components available to device 2700) may be configured to process graphical data at various resolutions, frequencies, intensities, and various other characteristics as may be appropriate for the capabilities and resources of first electronic device 2700.

Electronic device 27100 may also be provided with a housing 2701 that may at least partially enclose one or more of the components of first electronic device 2700 for protection from debris and other degrading forces external to device 2700. In some embodiments, one or more of the components of first electronic device 2700 may be provided within its own housing (e.g., input component 2710 may be an independent keyboard or mouse within its own housing that may wirelessly or through a wire communicate with processor 2702, which may be provided within its own housing).

Electronic device 2700 can be a generic representation the hardware and software of a particular platform or client device. Each platform is different. The differences can be characterized by hardware configurations, software configurations, and ability to locally render a product. As defined herein, locally rendered refers to a device that performs graphical and computational rendering of content by processing components (e.g., program code) of a product. For example, at least processor 2702 and graphics processing unit 2703 of any platform may be used to render content using components of a product.

Any processes described with respect to FIGS. 1-27, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method for using a system comprising a plurality of wireless communication circuits, comprising:
   sounding an alarm in response to an alert event;
   communicating a notification of the alert event via first wireless communication circuitry in response to the alert event, wherein the notification is received by a user device associated with an account linked to the system, and wherein the first wireless communication circuitry is configured to transmit the notification from the system to a central server over the internet;
   communicating the notification of the alert via third wireless communication circuitry to one or more local devices;
   detecting a non-contact gestural instruction from a user performed in a monitorable vicinity of the user device to silence the alarm;
   receiving, via the first wireless communications circuitry, a request for access status for a second wireless communications circuitry;
   receiving, via the first wireless communications circuitry, priority status from the second wireless communications circuitry;
   granting access to the second wireless communications circuitry based on the received request for access status and received priority status for the second wireless communications circuitry;
   receiving the instruction to silence the alarm from the user device via the second wireless communication circuitry, wherein the second wireless communication circuitry and the third wireless communication circuitry operate according to a priority scheme at non-overlapping time intervals such that the notification of the alert is sent to the one or more local device during an interval assigned to the third wireless communication circuitry, and the instruction to silence the alarm from the user device is sent during an interval assigned to the second wireless communication circuitry; and
   altering a state of the system by hushing the alarm in response to receipt of the instruction.

2. The method of claim 1, wherein the first wireless communication circuitry is a Wi-Fi wireless communications circuit, and wherein the second wireless communication circuitry is a Bluetooth wireless communications circuit.

3. The method of claim 1, further comprising:
   advertising the existence of the system to the user device via the second wireless communications circuitry;
   authenticating the user device; and
   processing data received from the user device after the user device is authenticated.

4. The method of claim 1, wherein the notification is a push notification.

5. The method of claim 1, wherein the notification is provided to the user device via the Internet.

6. The method of claim 1, further comprising:
   verifying that a location of the user device satisfies a location condition before altering the state of the system by hushing the alarm.

7. The method of claim 6, wherein the location condition requires that the user device be within a structure comprising the system.

8. The method of claim 1, further comprising:
coordinating access to a common RF medium between the first wireless communication circuitry and the second wireless communication circuitry.

9. A system, comprising:
first wireless communication circuitry that accesses a common RF medium;
second wireless communication circuitry that accesses the common RF medium;
third wireless communication circuitry that accesses the common RF medium; and
a processor operative to:
sound an alarm in response to an alert event;
communicate a notification of the alert event via the first wireless communication circuitry in response to the alert event, wherein the notification is received by a user device associated with an account linked to the system, and wherein the first wireless communication circuitry is configured to transmit the notification from the system to a central server over the internet;
communicate the notification of the alert via the third wireless communication circuitry to one or more local devices;
detect a non-contact gestural instruction from a user performed in a monitorable vicinity of the user device to silence the alarm;
receive, via the first wireless communication circuitry, a request for access status for the second wireless communication circuitry;
receive, via the first wireless communication circuitry, priority status from the second wireless communication circuitry;
grant access to the second wireless communication circuitry based on the received request for access status and received priority status for the second wireless communication circuitry;
receive the instruction to silence the alarm from the user device via the second wireless communication circuitry wherein the second wireless communication circuitry and the third wireless communication circuitry operate according to a priority scheme at non-overlapping time intervals such that the notification of the alert is sent to the one or more local device during an interval assigned to the third wireless communication circuitry, and the instruction to silence the alarm from the user device is sent during an interval assigned to the second wireless communication circuitry; and
alter the state of the system by hushing the alarm in response to receipt of the instruction.

10. The system of claim 9, wherein the first wireless communication circuitry is a Wi-Fi wireless communications circuit, and wherein the second wireless communication circuitry is a Bluetooth wireless communications circuit.

11. The system of claim 9, the second wireless communications circuitry is operative to perform at least one of the following:
advertise the existence of the system to the user device;
authenticate the user device; and
process data received from the user device after the user device is authenticated.

12. The system of claim 9, wherein the notification is a push notification.

13. The system of claim 9, wherein the notification is provided to the user device via the Internet.

14. The system of claim 9, wherein the processor is operative to:
verify that a location of the user device satisfies a location condition before the state of the system is altered by hushing the alarm.

15. The system of claim 14, wherein the location condition requires that the user device be within a structure comprising the system.

16. The system of claim 9, wherein the processor is operative to:
coordinate access to the common RF medium between the first wireless communication circuitry and the second wireless communication circuitry.

* * * * *